(12) United States Patent
Choi

(10) Patent No.: US 7,385,885 B2
(45) Date of Patent: Jun. 10, 2008

(54) MAGNETIC CIRCUIT FOR MOVING A LENS HOLDER OF AN OPTICAL PICK-UP ACTUATOR

(75) Inventor: In Ho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 605 days.

(21) Appl. No.: 10/419,533

(22) Filed: Apr. 21, 2003

(65) Prior Publication Data
US 2003/0198148 A1 Oct. 23, 2003

(30) Foreign Application Priority Data
Apr. 20, 2002 (KR) ........................ 10-2002-0021747
Aug. 19, 2002 (KR) ........................ 10-2002-0048957

(51) Int. Cl.
*G11B 7/00* (2006.01)
(52) U.S. Cl. ..................................... 369/44.16; 720/683
(58) Field of Classification Search ............. 369/44.16; 720/682, 683
See application file for complete search history.

(56) References Cited

U.S. PATENT DOCUMENTS

| | | | |
|---|---|---|---|
| 5,043,964 A | * | 8/1991 | Suzuki .................... 369/44.11 |
| 5,301,175 A | * | 4/1994 | Nakamura ................ 369/44.32 |
| 5,663,840 A | | 9/1997 | Matsui |
| 5,748,580 A | * | 5/1998 | Matsui ..................... 369/44.16 |
| 6,344,936 B1 | * | 2/2002 | Santo et al. ................ 359/824 |
| 6,721,110 B2 | * | 4/2004 | Song et al. ................. 359/814 |
| 7,054,236 B2 | * | 5/2006 | Kawano ................... 369/44.16 |

FOREIGN PATENT DOCUMENTS

| | | |
|---|---|---|
| CN | 1236946 | 12/1999 |
| CN | 1355613 | 2/2002 |
| EP | 2001155358 | 6/2001 |
| JP | 08-273176 | 10/1996 |
| JP | 2002-092916 | 3/2002 |

\* cited by examiner

*Primary Examiner*—William R. Korzuch
*Assistant Examiner*—Peter Vincent Agustin
(74) *Attorney, Agent, or Firm*—Lee, Hong, Degerman, Kang & Schmadeka

(57) ABSTRACT

Disclosed is a magnetic circuit operable in multiple axes in an optical pick-up actuator. The optical pick-up actuator includes: a lens holder for receiving and moving an object lens in a predetermined direction; a magnetic circuit having; a plurality of coils series and parallel connected and attached to both sides of the lens holder; a yoke and a magnet faced with the coils, for generating and inducing different polarities in perpendicular directions. With such construction, the actuator moves the lens holder to tracking, focusing, tilting directions under control of a direction and intensity of a current by the magnetic circuit.

13 Claims, 26 Drawing Sheets

Fig. 1
Related Art
(a)
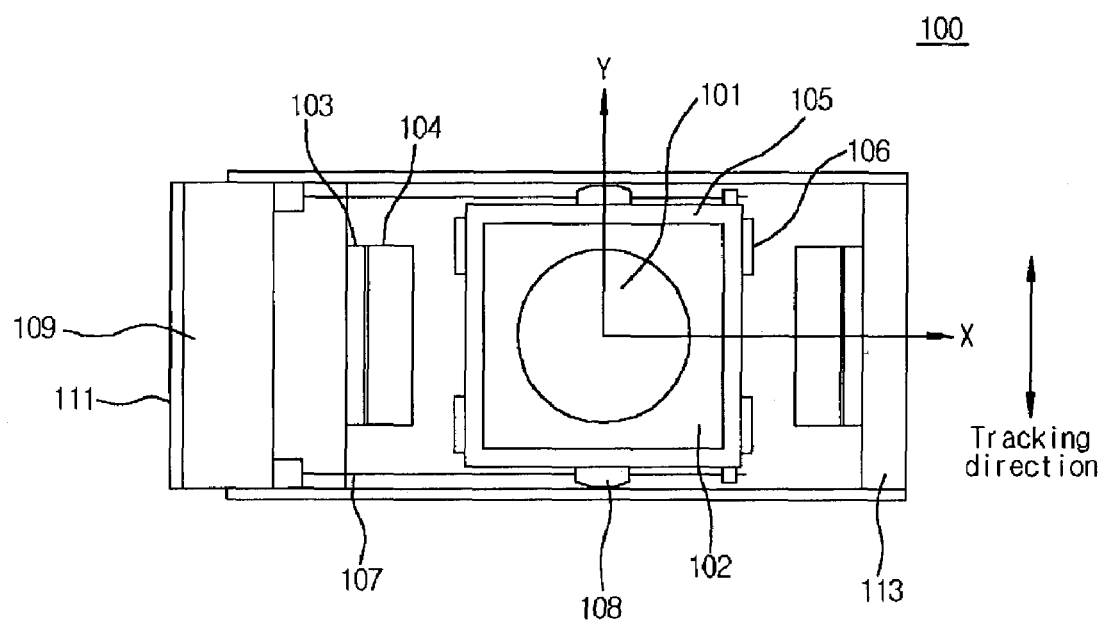
(b)
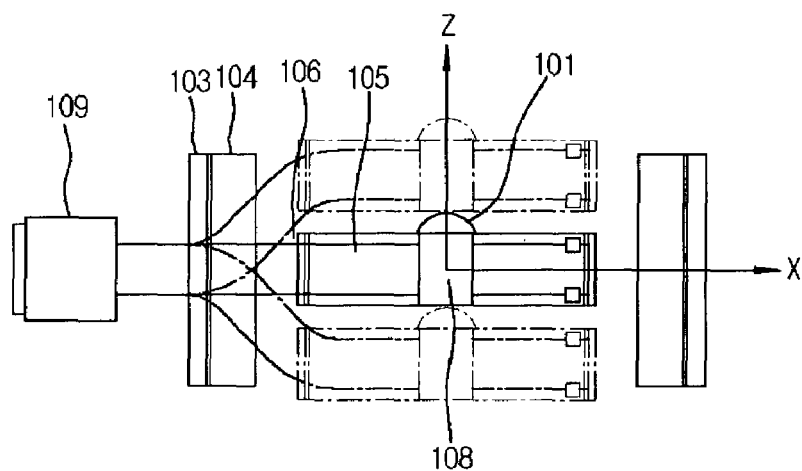

Fig.2
Related Art
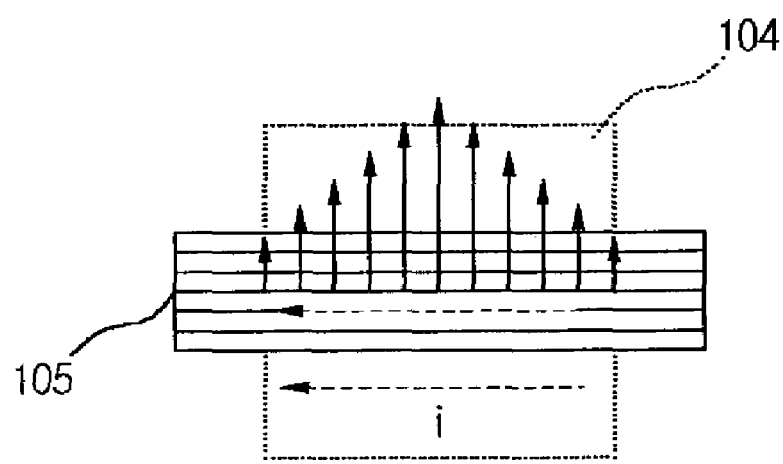
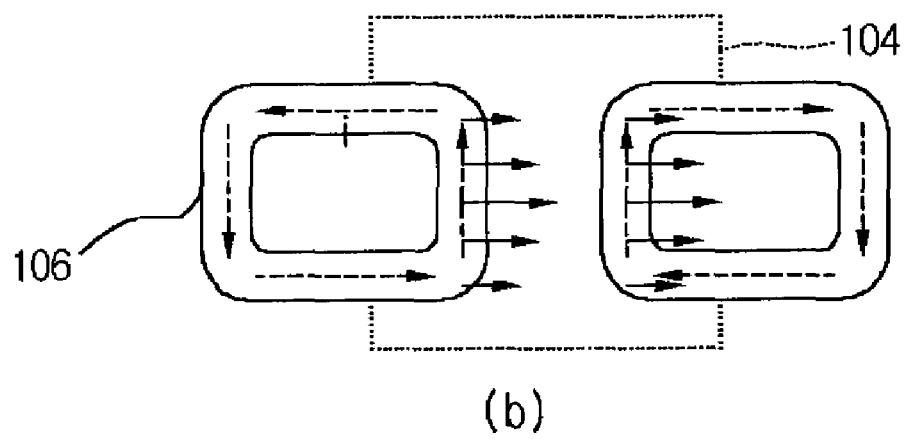
(b)

Fig.5
(a)
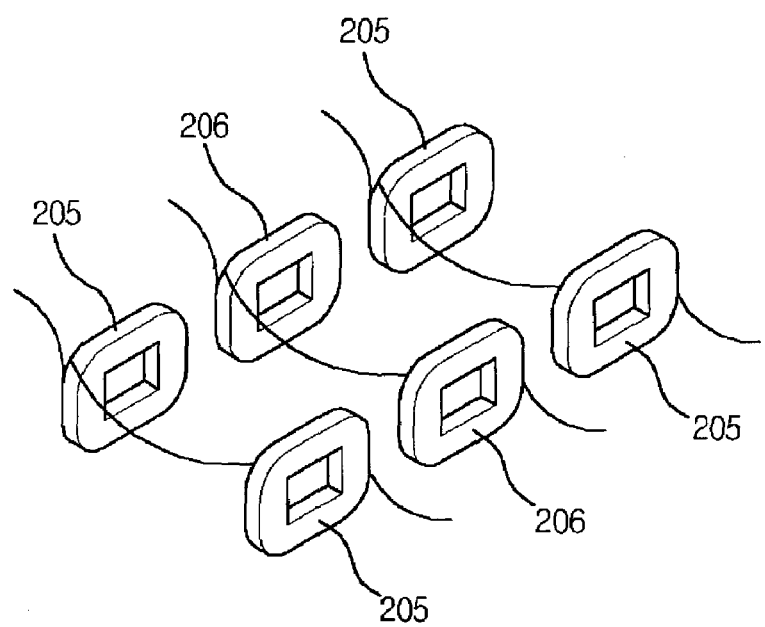
(b)
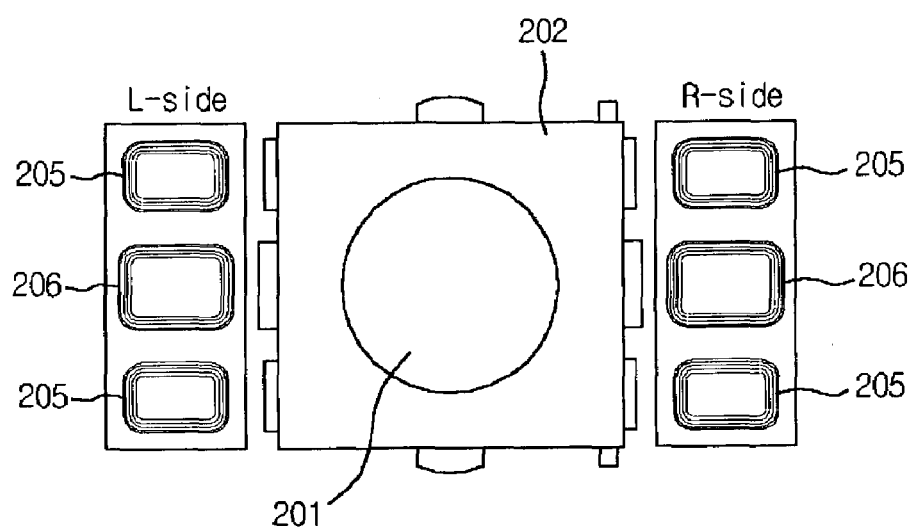

Fig.6
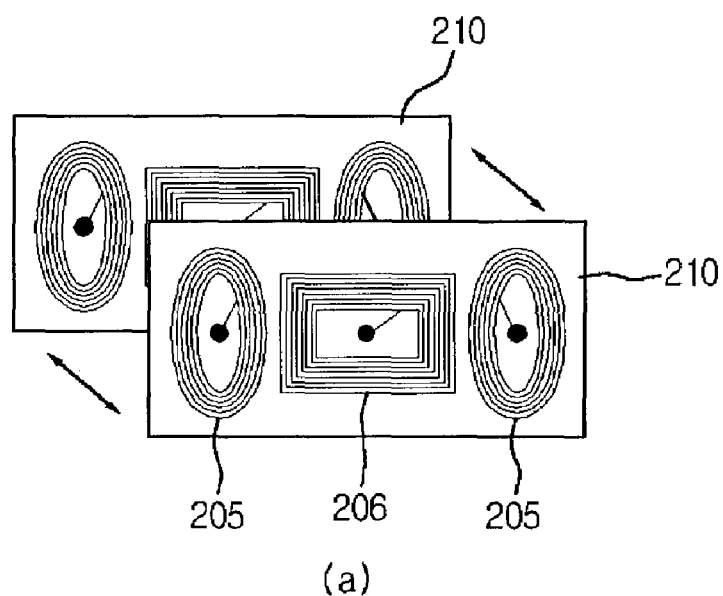
(a)
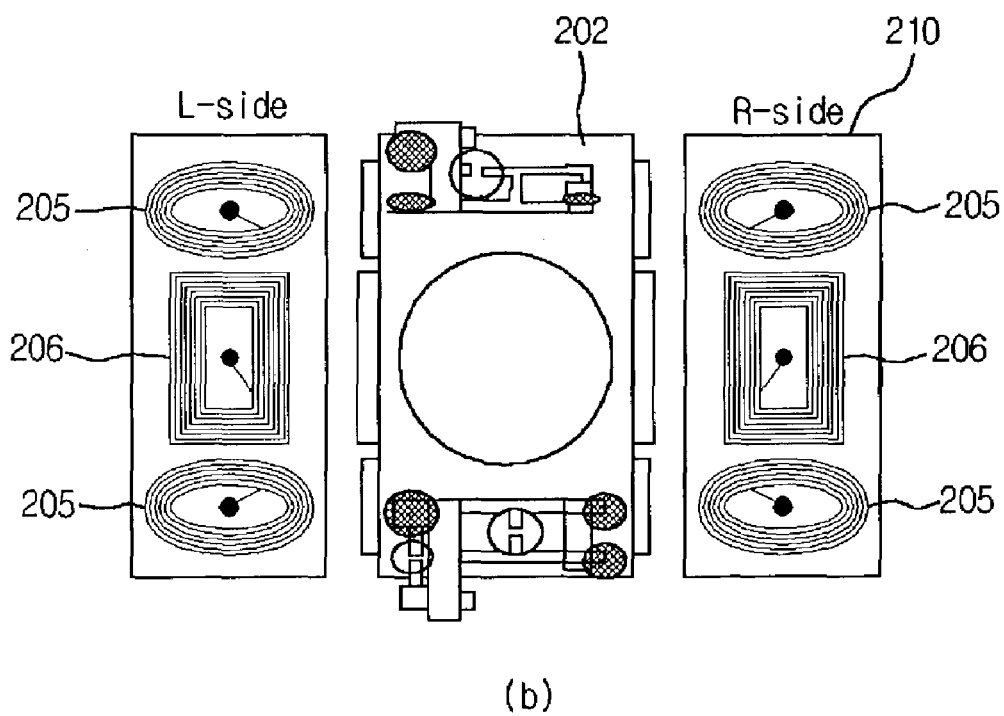
(b)

Fig.9
(a)
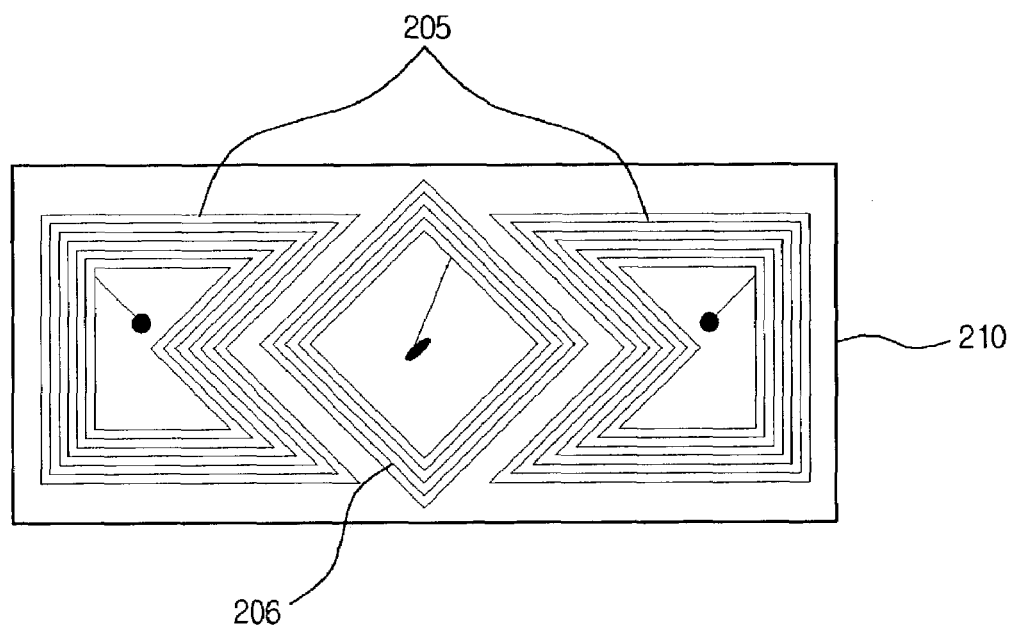
(b)
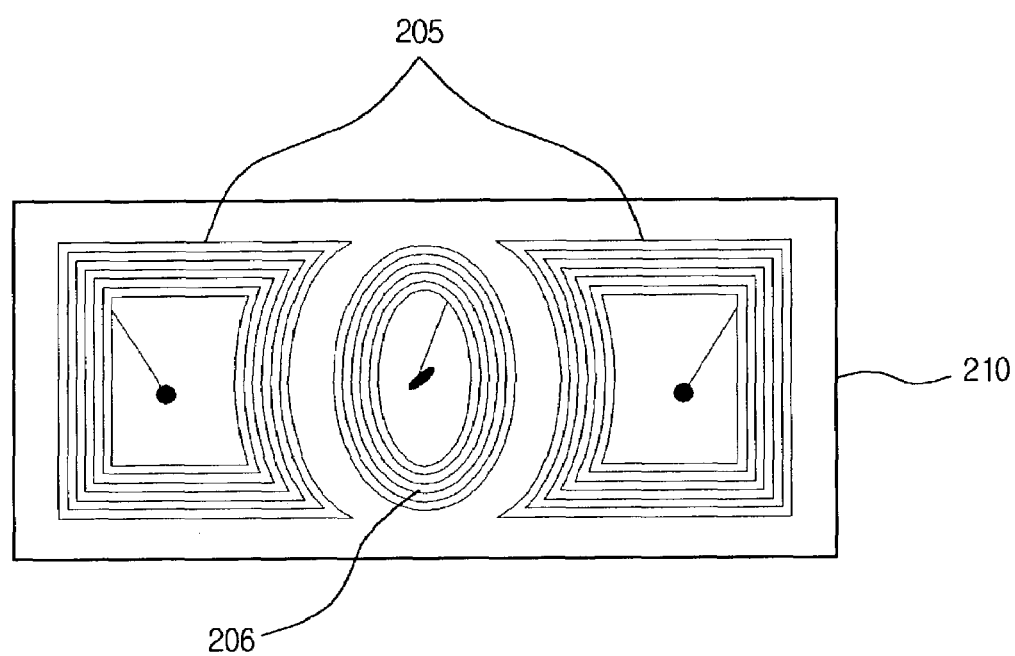

Fig. 11
(a)
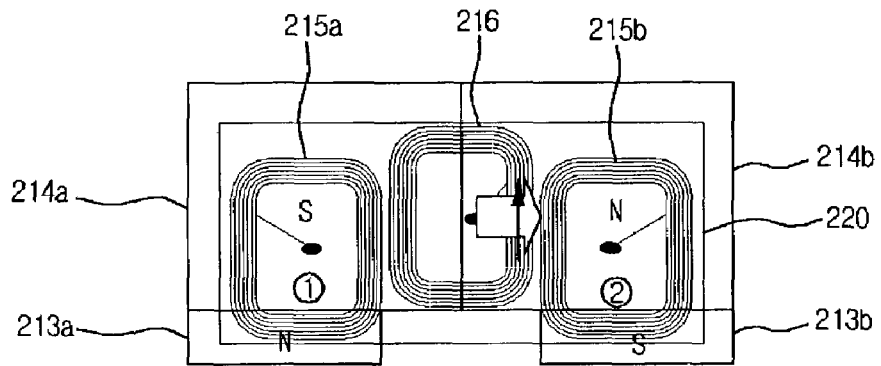
Track Force Direction
(b)
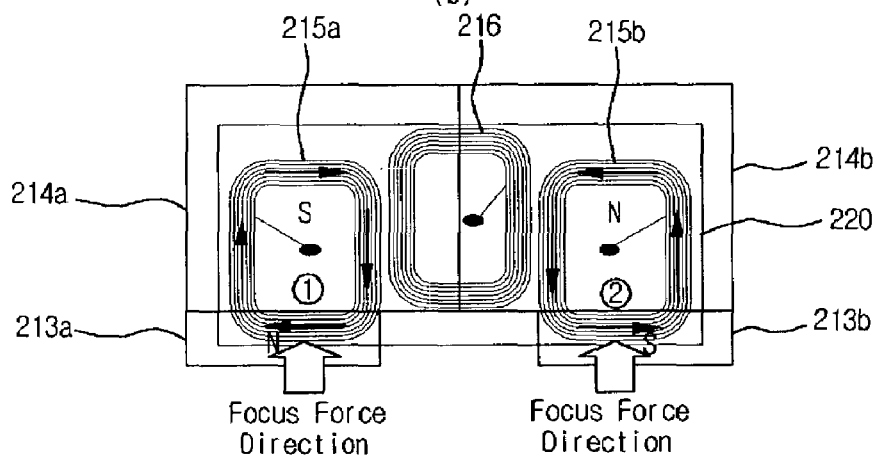
Focus Force Direction   Focus Force Direction
(c)
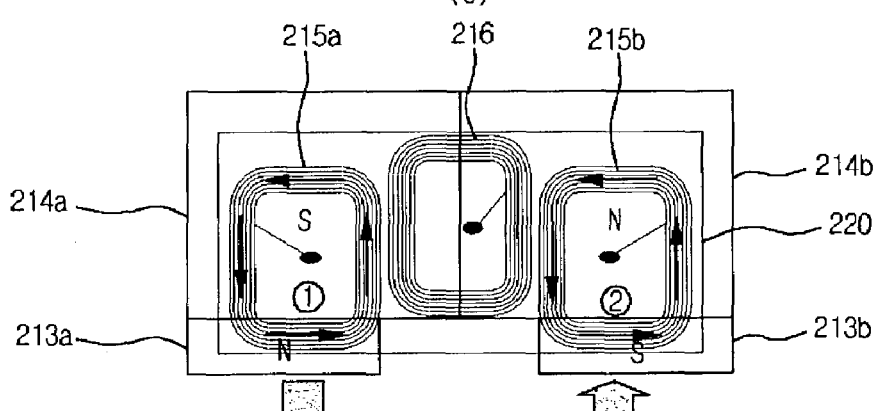
Radial Tilt Direction   Radial Tilt Direction Fig. 13
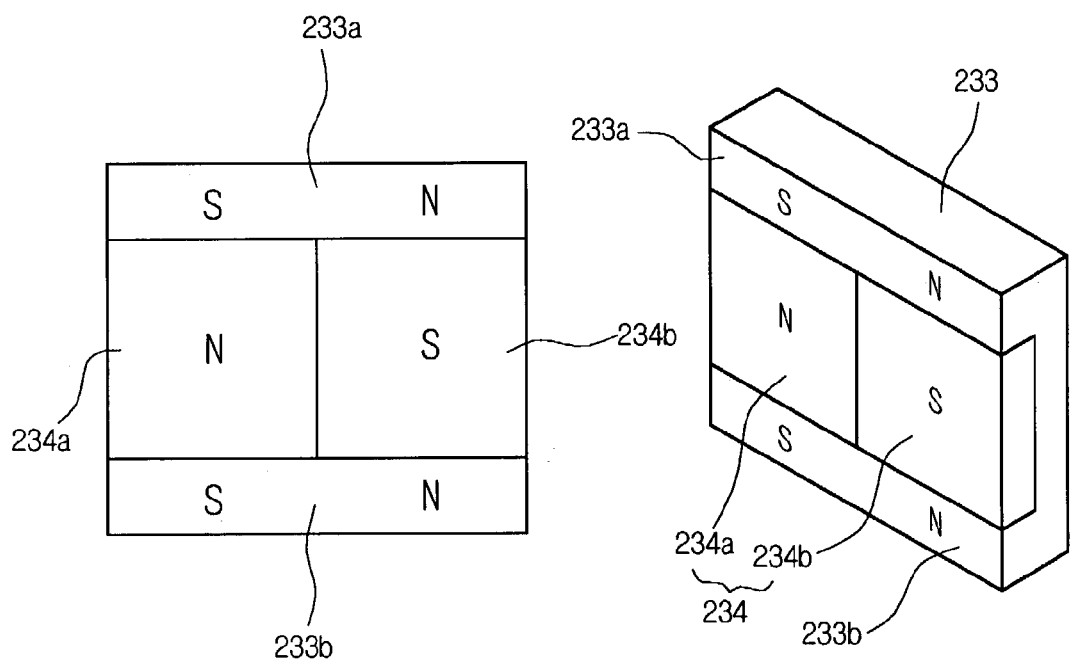
(a)  (b)
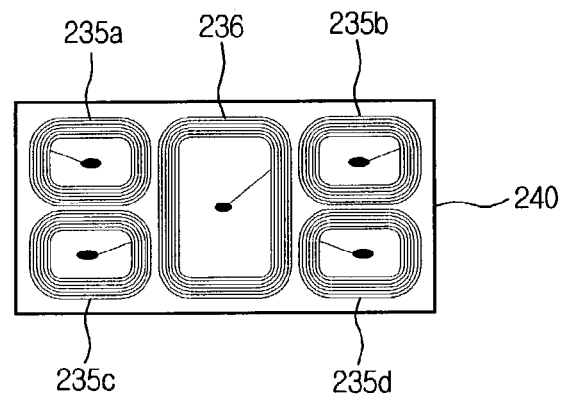
(c)

Fig. 19
(a)
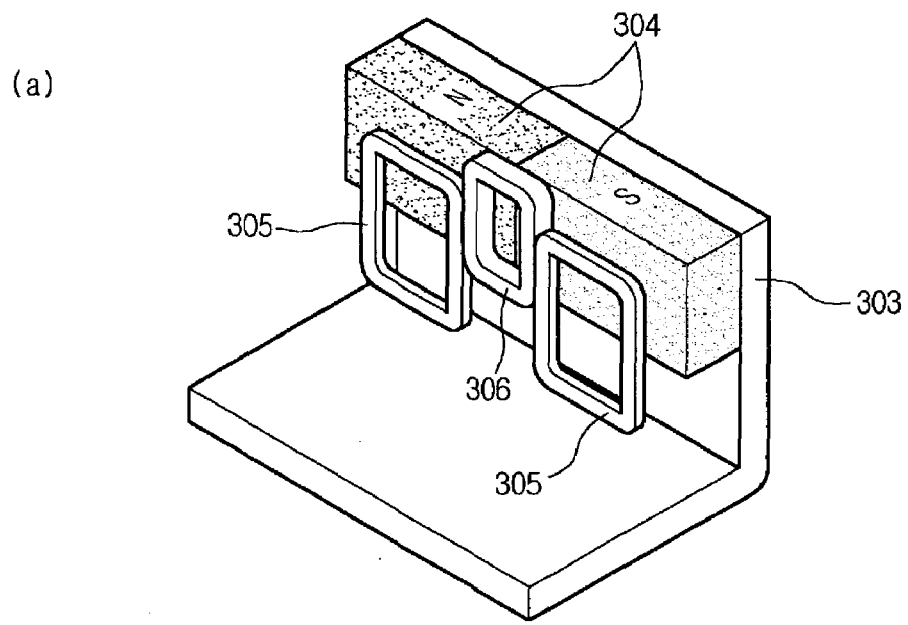
(b)
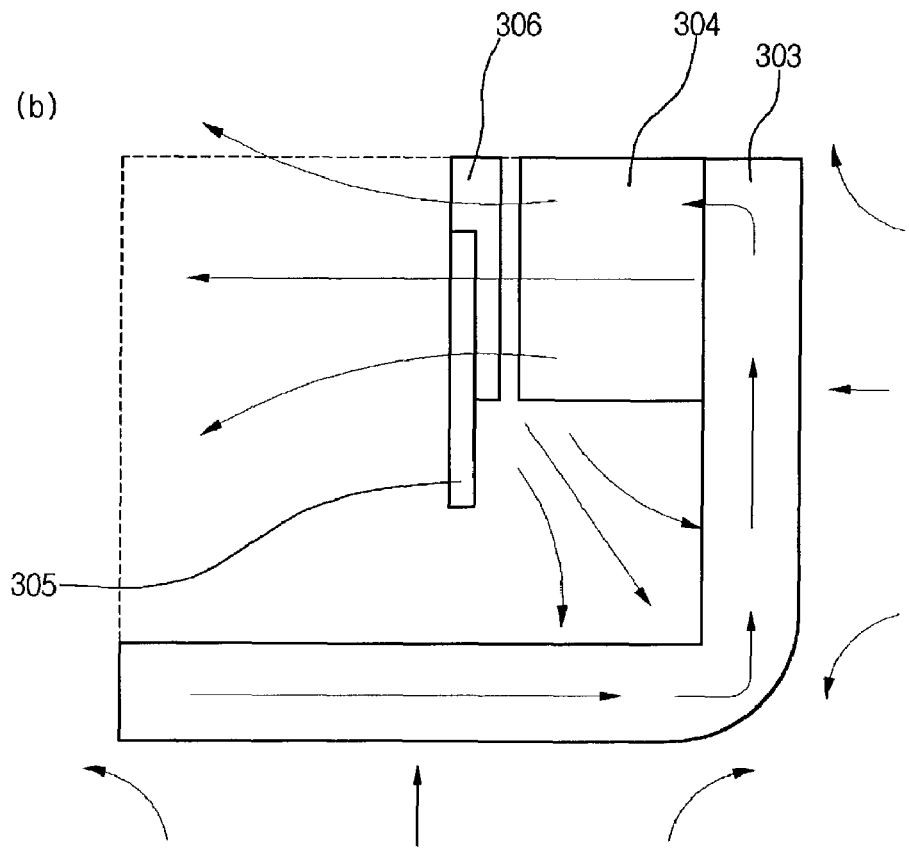

Fig.20
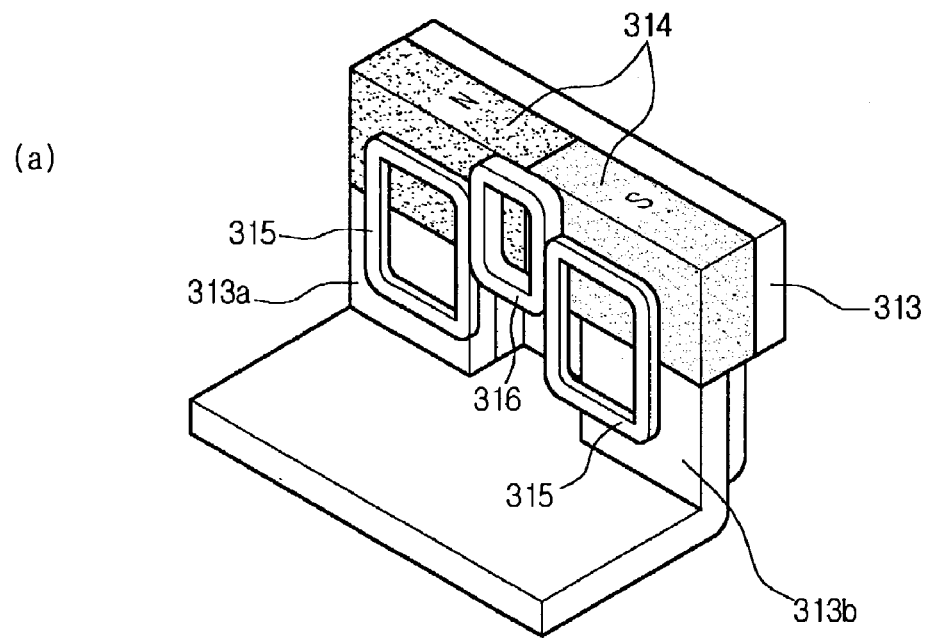
(a)
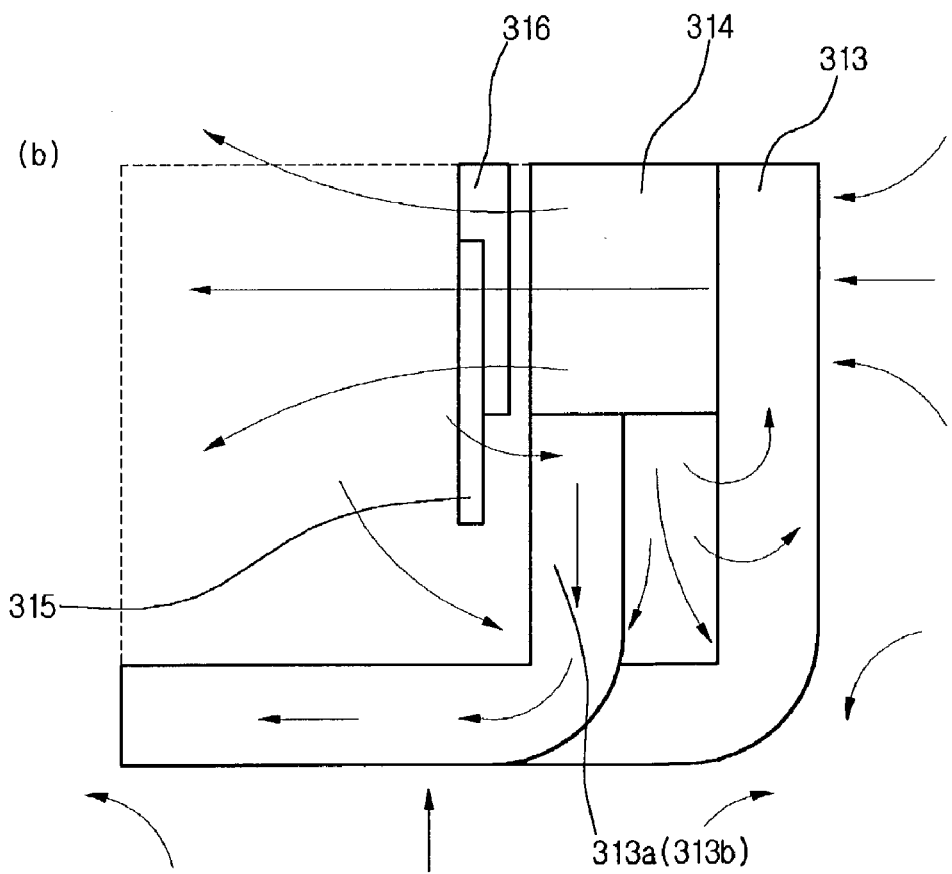
(b)

Fig.21
(a) 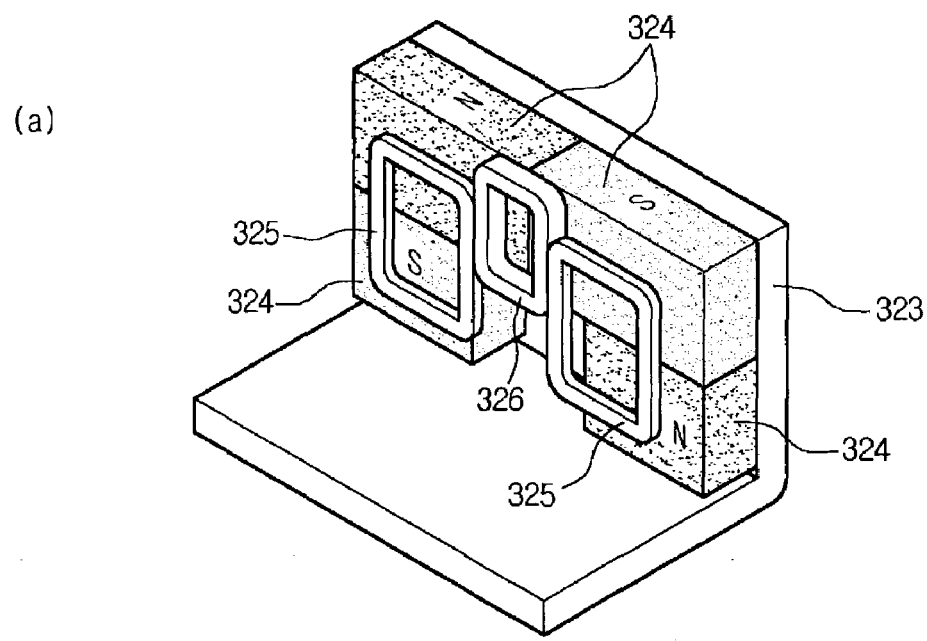
(b) 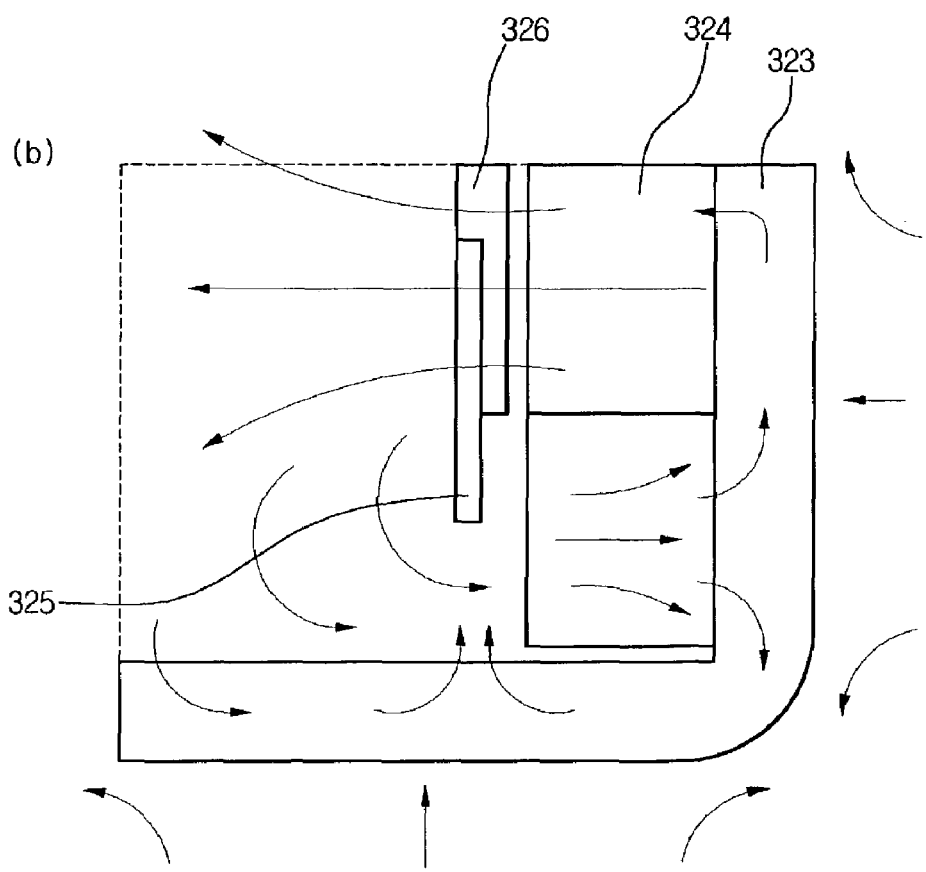

Fig.22
(a)
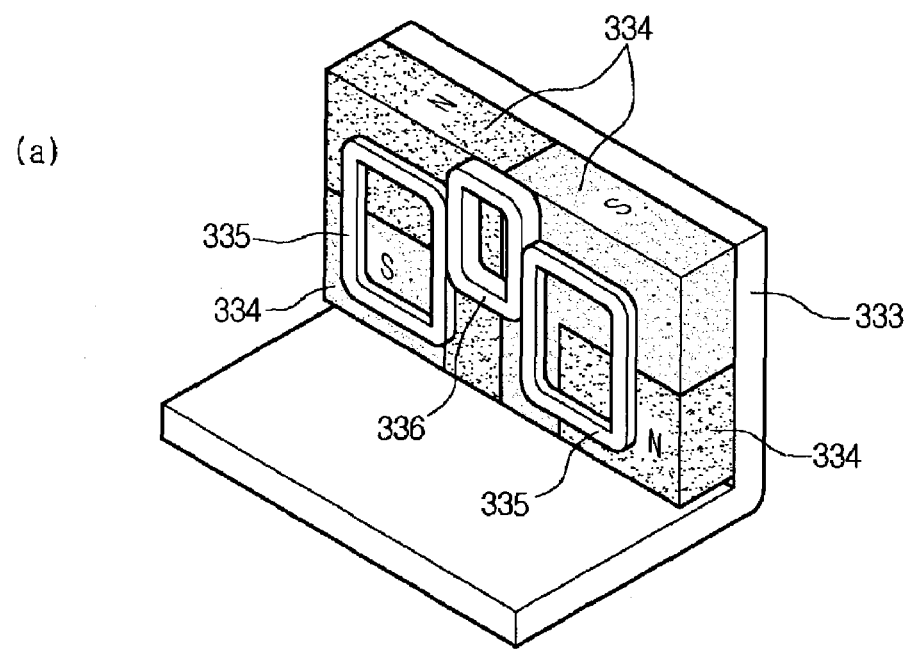
(b)
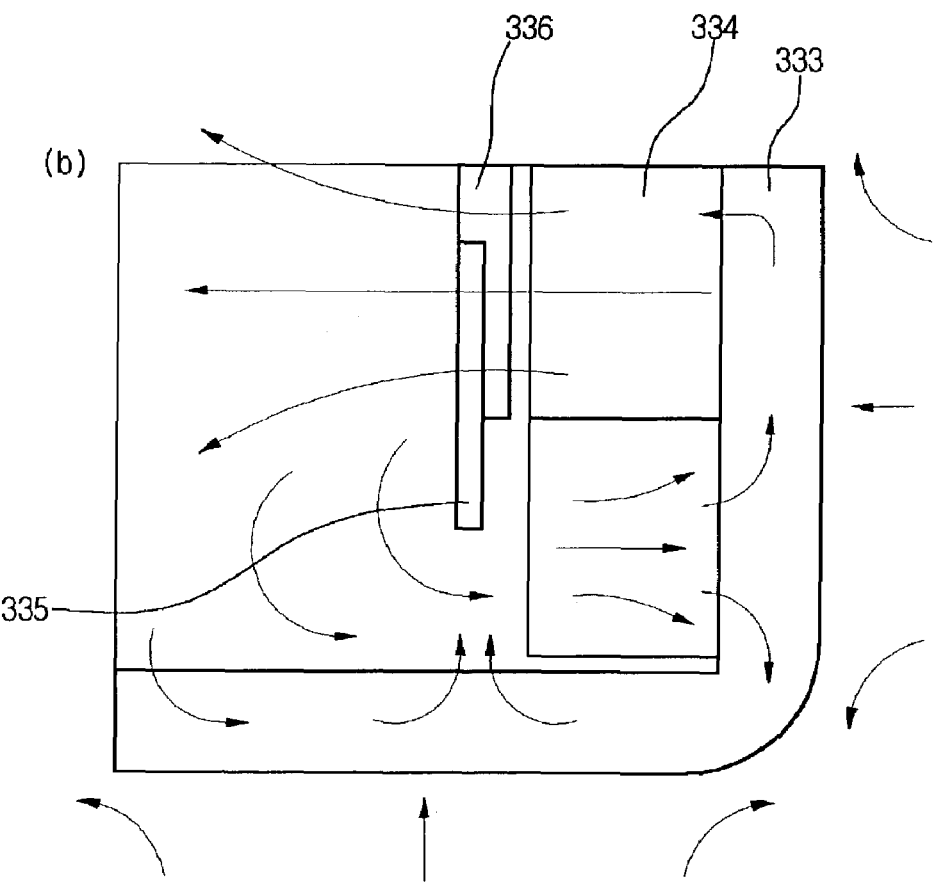

MAGNETIC CIRCUIT FOR MOVING A LENS HOLDER OF AN OPTICAL PICK-UP ACTUATOR

BACKGROUND OF THE INVENTION

1. Field of the Invention

The present invention relates to an optical pick-up actuator and more particularly to an optical pick-up actuator operable in multiple axes.

2. Background of the Related Art

Generally, an optical pick-up actuator plays a role of maintaining constant relative position between an object lens and an optical recording medium (e.g. a disk) by moving elements (bobbin, lens holder, etc.) including an object lens. Also, the optical pick-up actuator plays a role of recording information and playing recorded information by tracing a track of an optical recording medium.

FIG. 1 is a view of a structure for an optical pick-up actuator of a related art.

Referring to FIG. 1, the optical pick-up actuator of a related art is of a structure such that an object lens 101 is mounted on a lens holder 102, a focusing coil 105 for performing focusing being attached on a periphery of the lens holder 102, a tracking coil 106 wired in an appropriate direction, for performing tracking being attached on each corner section.

Also, a permanent magnet 103 is fixed on the inner surface of a U-shaped yoke 104 which is a member of ferromagnetic material positioned on right and left of the lens holder 102, and the yoke 104 is integrally formed together with a pick-up base (not shown) by integrating means.

A fixing unit 108 is joined to the central part on the lateral side of the upper and the lower part of such lens holder 102, one end of two parallel wire suspensions 107 being fixed in each of the fixing units 108, and the other end of the wire suspension 107 being fixed in a main PCB 111 through a frame 109 located on one side of the lens holder 102.

Here, a damper (not shown) is joined in the inside of the frame 109 so that the wire suspension 107 having rigid property may have attenuation characteristics and a main PCB (not shown) is joined in the outside of the frame so that the other end of the wire suspension 107 maybe fixed in a soldering manner.

Such wire suspension 107 raises the lens holder 102, playing a role of supplying a current as a relay line.

Operation of the actuator having the foregoing construction will be described in the following. As shown in FIG. 1 and FIG. 2, a focusing coil 105 is wired in vertical direction unlike a tracking coil, so that magnetic flux is generated in up and down direction upon flowing of a current i, interacting with magnetic flux of a fixed magnet 103, whereby force is generated, in vertical direction, at the focusing coil 105. Thanks to such vertical force, the lens holder 102 is moved in a focusing direction (vertically up and down) and a focusing servo operates for correcting a focusing error.

The tracking coils 106 attached on the lens holder 102 are appropriately wired each other, for generating magnetic flux in a predetermined direction upon flowing of a current, interacting with magnetic force of the fixed magnet 103, whereby repulsive force is generated. Thanks to such repulsive force, the lens holder 102 is moved in tracking direction (right and left), whereby a tracking servo operates for correcting a tracking error.

A type such that the coils 105 and 106 are wired on the outer periphety of the lens holder 102 and moved in the tracking and the focusing directions together with the lens holder 102, is referred to as a moving coil type. On the contrary, a type such that a magnet is attached on the outer periphery of the lens holder 102 and moved together with the lens holder 102, is referred to as a moving magnet type. At the moment, movement types by the magnet and the coil make use of Lorenz force by Fleming's left-hand rule.

Such optical pick-up actuator 100 moves using coils operable by magnetic field of permanent magnet, whereby an object lens is moved to a predetermined desired position on an optical recording medium. At the moment, the lens holder, which is a moving part of the optical pick-up actuator, is fixed by the wire suspension having rigid property and attenuation characteristics, so that a predetermined frequency characteristics is provided. Also, the lens holder performs a translational motion in the focusing and the tracking directions which are two mutually perpendicular directions, and motion should be performed without unnecessary vibration such as rotation and twisting.

But, in the structure as shown in FIG. 1, sufficient control for reading and writing recorded information could not be made in response to a disk of high density. Namely, as capacity of a disk increases, data recorded per unit length of a track formed on a disk increases, and a number of tracks themselves formed on a disk increases.

In a record density of a general disk, a width of a track itself and an interval between tracks are useful so that data could be sequentially and sufficiently accessed by only movements of the pick-up itself and the lens of the actuator, but in a disk format of high density, data could not be exactly accessed by the actuator of a related art.

To resolve such problems, as shown in FIG. 3, a tilt component needs to be corrected so that a laser beam reflected through the reflecting mirror 112 may be exactly projected to a reflection plane of an optical disk 110 by an object lens 101.

But, to correct a tilt component according to movement of the lens holder 102, the actuator should operate in a tilting motion mode in a radial direction as well as the translational motions in the tracking and the focusing directions. According to the related art structure, however, operation in the tilting motion mode is not possible.

SUMMARY OF THE INVENTION

An object of the invention is to solve at least the above problems and/or disadvantages and to provide an optical pick-up actuator operable in multiple axes.

Accordingly, one object of the present invention is to solve the foregoing problems by providing an optical pick-up actuator such that a magnetic circuit is includes a plurality of coils connected in series/parallel in each of both sides of a moving pad and a polarity generating means where different polarities are perpendicular to each other, and the lens holder is moved in the tracking, the focusing, and the radical radial directions using the magnetic circuit.

Another object of the present invention is to provide an optical pick-up actuator having a magnetic circuit such that coils on the central portion on both sides of the moving part are series connected and faced with a boundary surface between different polarities, for tracking movement, and coils on right/left in both sides of the lens holder are parallel connected and faced with a boundary surface between different polarities, for moving in focusing/radial tilting direction among a plurality of the coils.

Further another object of the invention is to provide an optical pick-up actuator capable of improving movement force of the focusing coil, the tracking coil and the tilting coil prepared in the corresponding position due to effect of the magnet having multiple poles, by arranging the magnet having multiple poles and magnetic yoke so that magnetic flux generated from magnetic material having different poles constitutes a closed circuit.

The foregoing and other objects and advantages are realized by providing an optical pick-up actuator including: a lens holder for receiving and moving an object lens in a predetermined direction; a plurality of first coils parallel connected on one side of both sides of the lens holder, for focusing and tilting movement of the lens holder, a single second coil attached on a central portion in both sides of the lens holder, for tracking movement of the lens holder, and a polarity generating means faced with the first and the second coils, for generating different polarity in perpendicular directions.

BRIEF DESCRIPTION OF THE DRAWINGS

The above objects, features and advantages of the present invention will become more apparent from the following detailed description when taken in conjunction with the accompanying drawings, in which:

FIG. 1 is a plan view and a sided view of an optical pick-up actuator of a related art;

FIG. 2 is a view showing operation status of a magnetic circuit of an optical pick-up actuator of a related art;

FIG. 5 is a view showing application status of wire type coil according to an embodiment of the present invention;

FIG. 6 is a view showing application status of a fine pattern coil according to an embodiment of the present invention;

FIG. 9 is a view showing another example for a shape of a fine pattern coil according to the present invention;

FIG. 11 is a view showing movement status to the tracking, the focusing, the tilting directions by a magnetic circuit construction of FIG. 10;

FIG. 13 is a view showing a magnetic circuit construction of an optical pick-up actuator according to a fourth embodiment of the present invention;

FIG. 19 through FIG. 22 are a schematic view applying a wire type coil to a magnetic circuit according to an embodiment of the present invention and a view showing magnetic field distribution of a magnet;

DETAILED DESCRIPTION OF PREFERRED EMBODIMENTS

The following detailed description will present an optical pick-up actuator according to a preferred embodiment of the invention in reference to the accompanying drawings.

The present invention provides a magnetic circuit for moving a lens holder of an optical pick-up actuator in the tracking, the focusing, and the radial tilting directions, and the magnetic circuit includes a magnet and a plurality of auxiliary means whose polarity is induced so that different polarities are generated in a perpendicular direction and a center of coil movement faces a boundary surface between the different polarities. In one embodiment, instead of a plurality of auxiliary means, one single magnet having multiple poles or a plurality of single pole magnets may be used in order to generate more than four polarities, and the coil facing the boundary surface between the polarities may be located such that the lens holder could be moved.

Figure 3:
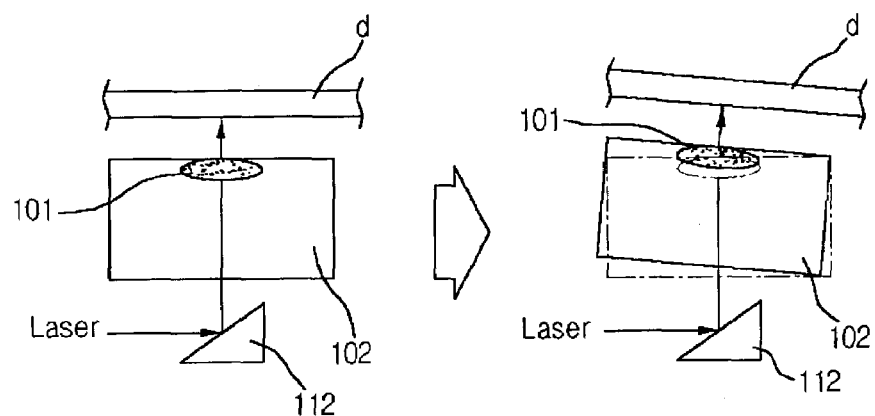
FIG. 3 is a view showing tilt correction for a disk according to an actuator.
Figure 4:
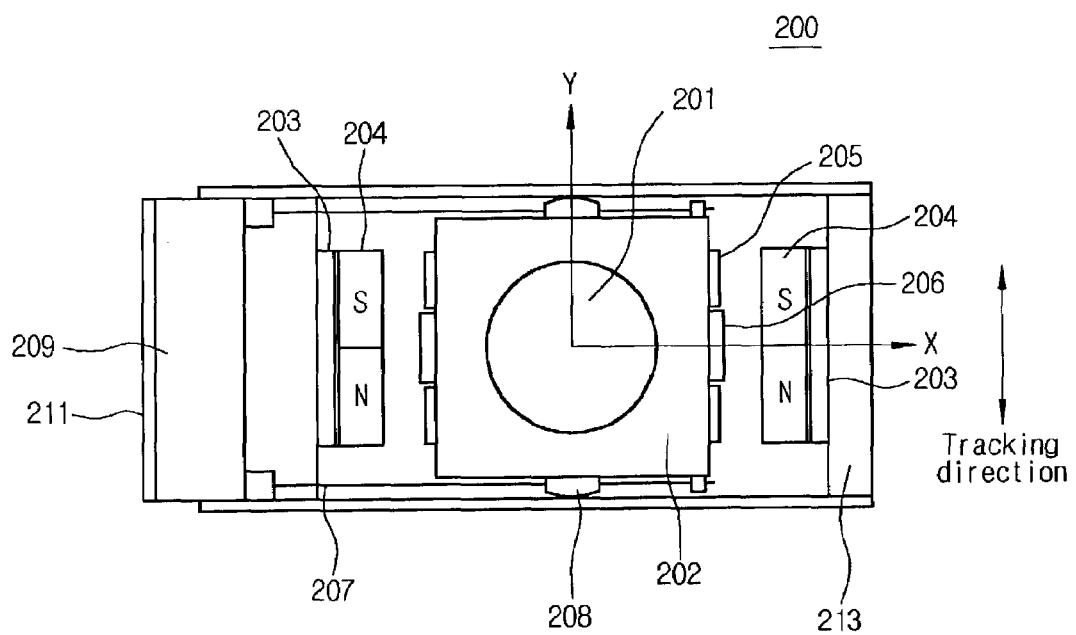
FIG. 4 is a plan view of an optical pick-up actuator according to an embodiment of the present invention.

FIG. 4 is a plan view of an optical pick-up actuator according to the present invention.

Referring to FIG. 4, an optical pick-up actuator of the present invention includes: a lens holder 202 having an object lens 201 on its central portion; an U-shaped yoke 203 projected from a magnet 204 of a pick-up base; the magnet 204 having multiple poles and attached on an inside of the U-shaped yoke 203; a plurality of first coils 205 attached on right/left inboth sides of the lens holder 202 and facing the magnet 204, and a second coil 206 attached on a central portion of the lens holder 202; a pair of wire suspensions 207 for connecting and supporting a fixing unit 208 on a lateral end of the lens holder 202 and a fixed frame 209; and a main PCB 211 attached on a back of the wire suspension 207.

Here, the first coils 205 are focusing/tilting coils such that a plurality of coils is parallel connected and different polarities are faced with each other in vertical direction, and movement in the focusing or the tilting directions is controlled by making directions (+,−) of a current applied to the first coils 205 same or different each other.

Also, the second coil 206 is a tracking coil such that different polarities of the magnet 204 are faced with in horizontal direction, so that the lens holder is moved in the tracking direction depending on directions (+,−) and intensity of a current.

As described above, the first coils and the second coil 205 and 206 may be installed independently on both sides of the lens holder, respectively, or on one single substrate in form of a printed status. Namely, as shown in FIGS. 5(a) and (b), the first coils and the second coil 205 and 206 maybe fixed by a manner of a wire type coil where the first coils and the second coil are wired respectively and attached on the lens holder with being fixed by a bobbin (not shown), or as shown in FIGS. 6(a) and (b), the first coils and the second coil may be installed by being printed on a fine pattern coil PCB 210 in form of fine pattern (FP). At the moment, the coils are formed in a rectangular shape so that big movement force could be generated.

Here, the first coils 205 and the second coil 206 are provided with a current from the wire suspension 207 connected, in pairs (two or three), on each lateral side of the lens holder.

The optical pick-up actuator according to an embodiment of the present invention has an object lens 201 mounted on the central portion of the lens holder 202, and a magnetic circuit formed using a pair of the first coils 205 connected in parallel on both lateral sides, a single second coil 206, a yoke 203 and a magnet 204. Here, the coils 205 and 206 are respectively formed as a wire type coil or a fine pattern type coil PCB on which coils are wired in a fine pattern.

Also, for magnetic material means for being faced with the coils 205 and 206 of the lens holder 202, the magnet having multiple poles, a plurality of single pole magnets, combination of a plurality of magnetic yokes may be used in order to generate at least four polarities.

Such lens holder 201 is supported by the wire suspension 207 under the influence of electromagnetic force generated from the magnetic circuit and moved in the tracking, the focusing, and the tilting directions.

Magnetic circuit will be described for each embodiment in the following.

First Embodiment

Figure 7:
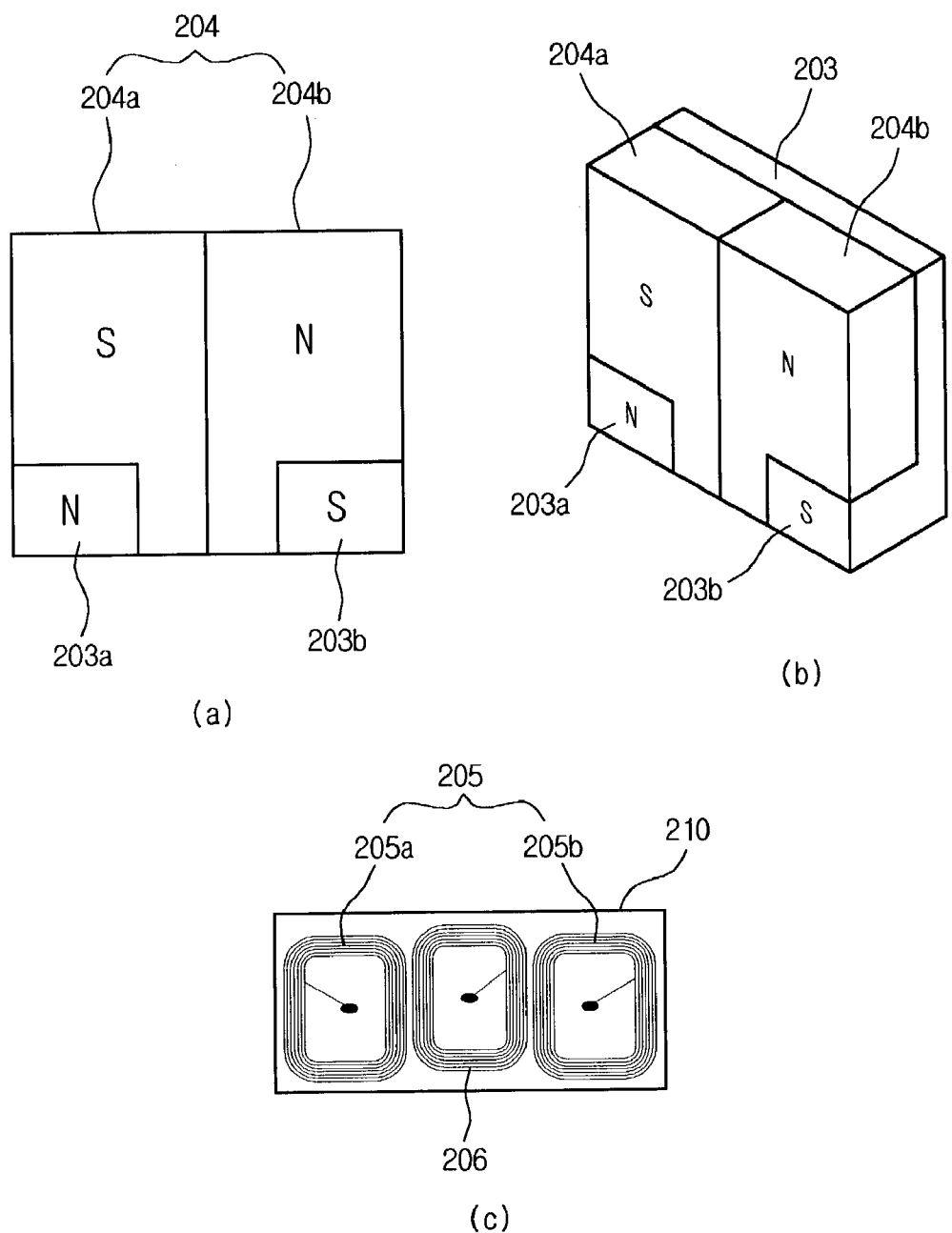
FIG. 7 is a view showing magnetic circuit construction of an optical pick-up actuator according to a first embodiment of the present invention.
Figure 8:
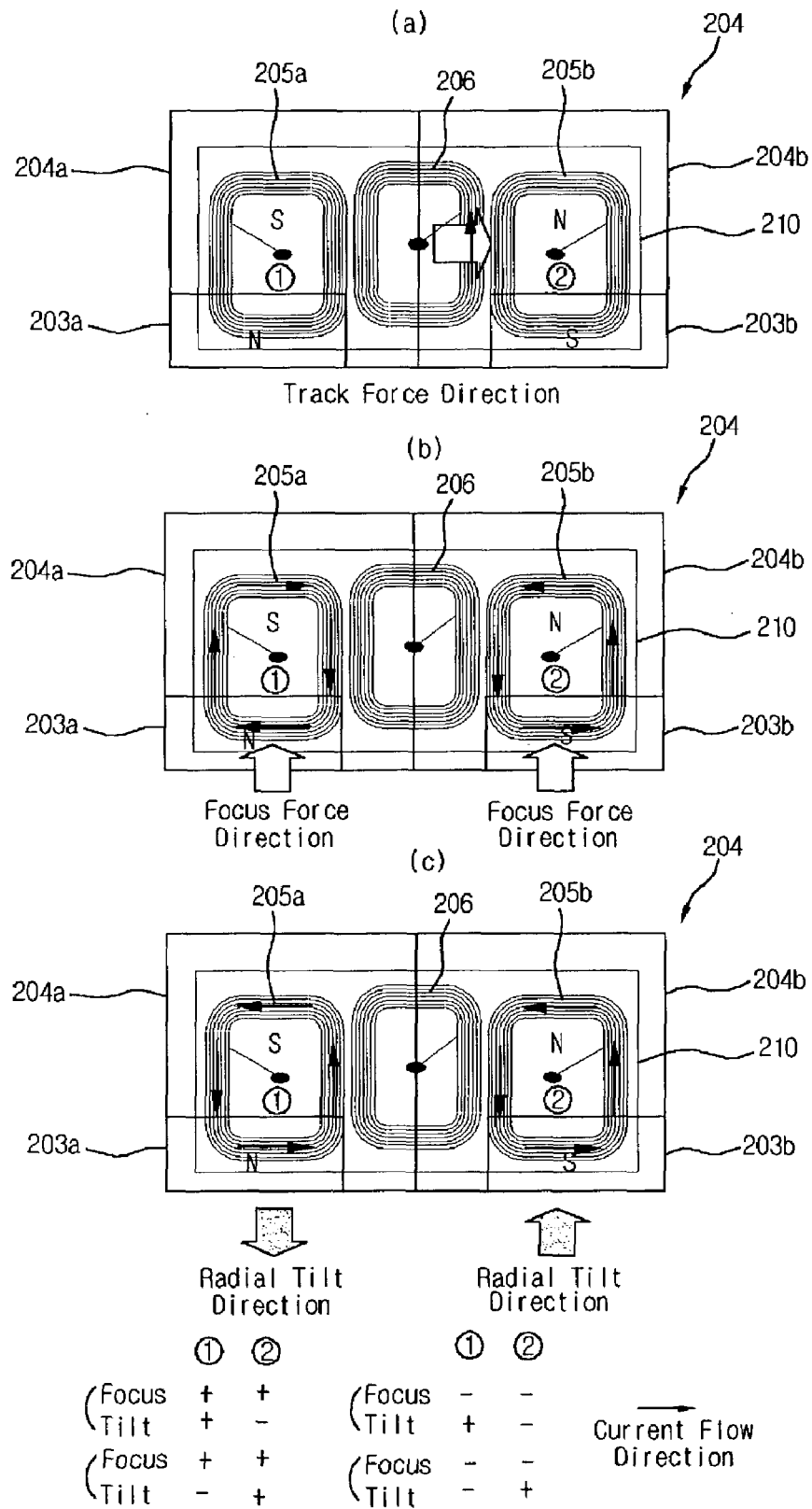
FIG. 8 is a view showing movement status to the tracking, focusing, tilting directions by a magnetic circuit of FIG. 7.

FIG. 7 and FIG. 8 show the first embodiment of the present invention. The first embodiment includes: a magnet 204(204a, 204b) having multiple poles of different polarities; a plurality of magnetic yokes 203a and 203b; and a plurality of coils 205a, 205b, 206. Here, description will be made with the reference numerals 204a and 204b given to the first magnet and the second magnet, respectively, depending on polarity of the magnet 204.

Referring to FIG. 7, the magnet 204(204a and 204b) having multiple poles in a symmetric '⌐' shape is attached horizontally on the yoke body 203, and the magnetic yokes 203a and 203b projected right/left from the yoke body 203 are formed on one end in the lower portion of the magnet 204, respectively. For an embodiment, instead of the magnet having two poles, a plurality of single pole magnets may be used.

Here, a polarity opposite to the polarity of the first magnet 204a on the upper end, is induced at the first magnetic yoke 203a, while a polarity opposite to the polarity of the second magnet 204b on the upper end, is induced at the second magnetic yoke 203b. The magnetic yokes 203a and 203b are integrally formed on the yoke body 203.

From and to such magnets 204(204a and 204b) and the magnetic yokes 203a and 203b, magnetic flux that is perpendicular in horizontal and vertical directions, diverges and converges. Here, the polarities of the magnets may be made opposite.

Also, the magnet 204(204a and 204b) having multiple poles and the magnetic yokes 203a and 203b are faced with the first coils and the second coil 205 and 206, whereby the magnetic circuit could be prepared. The first coils 205 are parallel connected each other in their right/left sides, and a center of movement of each coil 205a and 205b is positioned on a boundary between the magnets 204a and 204b in vertical direction, and a boundary between the magnetic yokes 203a and 203b, namely, a boundary between polarities, while a center of movement of the second coil 206 is positioned on a boundary between the first and the second magnets 204a, 204b having different polarities. For an embodiment, the first and the second coils may be used in form of the wire type coil or in a status printed on the fine pattern coil PCB 220.

Regarding movement in the tracking direction, as shown in FIG. 8(a), if a current of a predetermined directions (+,−) and intensity is applied to the second coil 206, electromagnetic force is generated between the second coil 206 and the magnet 204(204a and 204b) of different polarities, whereby the lens holder is moved in the tracking direction.

Regarding movement in the focusing direction, as shown in FIG. 8(b), if a current of the same direction and the same intensity is applied to the first coils 205a and 205b, electromagnetic force is generated between the first magnet 204a perpendicular to the first coils 205a, 205b and the first magnetic yoke 203a, and between the second magnet 204b and the second magnetic yoke 203b, whereby the lens holder is moved in the focusing direction.

Regarding movement in the radial tilting direction, as shown in FIG. 8(c), if currents whose directions are opposite and whose intensities are the same, are applied to the first coils 205a and 205b parallel connected in their right/left sides, then electromagnetic force is generated between the first magnet 204a perpendicular to the first coils 205a, 205b and the first magnetic yoke 203a, and between the second magnet 204b and the second magnetic yoke 203b, whereby the lens holder is moved in the radial tilting direction. Namely, the left of the lens holder is moved in the down focusing direction while the right of the lens holder is moved in the up focusing direction.

Here, regarding movement of the lens holder to the tracking, the focusing, and the tilting directions as shown in FIGS. 8(a),(b),(c), if a current is reversed in its direction, movement to the opposite direction is generated and movement distance is determined depending on intensity of a current.

Figure 10:
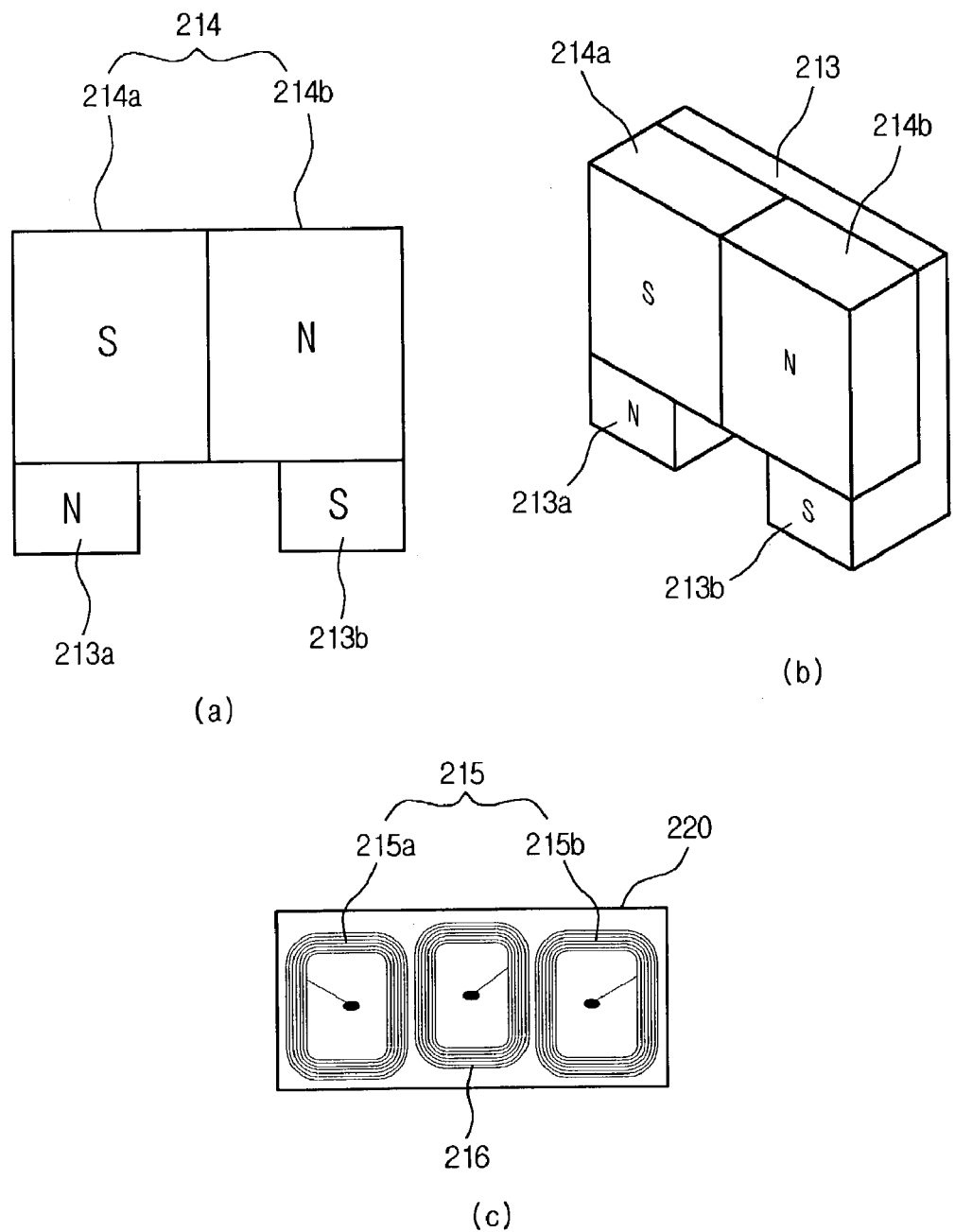
FIG. 10 is a view showing a magnetic circuit construction of an optical pick-up actuator according to a second embodiment of the present invention.

In other words, in case of the movement in the focusing direction in FIG. 10, a current of the same direction is applied to ①,② of the first coils 205a and 205b, and in case of the movement in the radial tilting direction, currents of the opposite directions are applied to ①,② of the first coils 205a and 205b, respectively, and the final movement characteristics where the focusing movement and the tilting movement are summed, is realized by summing these two signals. Namely, directions of the focusing movement force and tilting movement force could be controlled by polarities of the magnets 204a and 204b, induced polarities of the magnetic yokes 203a and 203b, and directions of the current flowing in the first coils 205a and 205b parallel connected, whereby focusing servo and tilting servo for recording medium could be performed.

Also, direction of the tracking movement force could be controlled by direction of a current flowing in the second coil 206 prepared in the boundary between polarities of the magnets 204a and 204b, whereby tracking servo for recording medium could be performed.

Also, magnetic field flux of a closed circuit is formed with use of the magnet 204 having multiple poles and a plurality of magnetic yokes 203a and 203b, and the focusing/tilting coils and tracking coil are mounted on the position where the formed magnetic field flux could be effectively used, whereby the focusing movement force, the tilting movement force and the tracking movement force could be improved.

Also, instead of the magnet 204 having multiple poles used in the above, a plurality of single pole magnets may be used.

FIG. 9 is a view showing a status that coils are formed on the PCB 210. Wiring shape of the second coil 206 may be formed in a rhombic shape or an egg shape, and the first coils 205 may be printed, by a fine pattern, in a shape corresponding to the wiring shape of the second coil 206.

Second Embodiment

FIG. 10 and FIG. 11 show the second embodiment of the present invention. The magnetic circuit includes: a magnet 214(214a, 214b) having multiple poles; two magnetic yokes 213a and 213b; and a plurality of coils 215a, 215b, 216. Here, description will be made with the reference numerals 214a and 214b given to the first magnet and the second magnet, respectively, depending on polarity of the magnet 214.

As shown in FIGS. 10(a),(b), a plurality of magnets 214(214a and 214b) of a rectangular shape horizontally arranged and attached on the yoke body 213, and a first and a second magnetic yokes 213a and 213b projected from the yoke body 213 on each of lower portions of the magnets 214 are provided, and the first and the second yokes 213a and 213b have induced polarities opposite to the polarities of the magnets 214. For an embodiment, instead of the magnet having multiple poles and the magnetic yokes, two or four single pole magnets may be used.

Also, as shown in FIG. 10(c), first coils 215(215a and 215b) are printed on the left/right sides of a fine pattern PCB, and a second coil 216 is arranged on the center. Here, a center of movement of the first coil 215a on the left is faced with a boundary between the first magnet 214a and the first magnetic yoke 213a, and a center of movement of the first coil 215b on the right is faced with a boundary between the second magnet 214b and the second magnetic yoke 213b. Also, a center of movement of the second coil 216 is faced with a boundary between the first and the second magnets 214a, 214b. For an embodiment, the first coils and the second coil may be used in a printed form on a fine pattern coil PCB 220 or independently used in form of a wire type coil.

FIGS. 11(a),(b),(c) show controlling of the tracking, the focusing, and the tilting movements by the magnetic circuit as shown in FIG. 10. FIG. 11 operates in the same way as FIG. 8. Therefore, detailed description thereof will be omitted.

Third Embodiment

Figure 12:
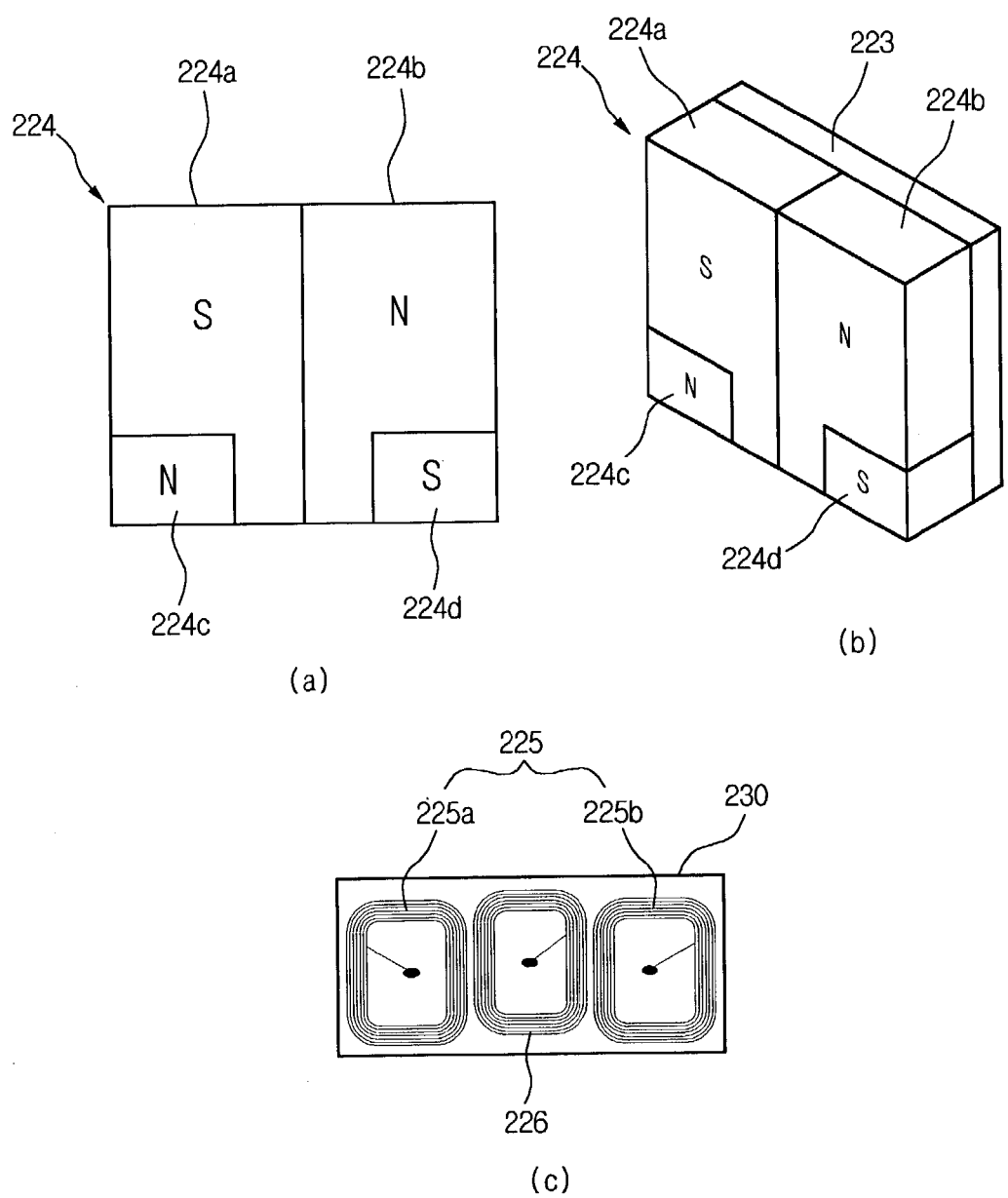
FIG. 12 is a view showing a magnetic circuit construction of an optical pick-up actuator according to a third embodiment of the present invention.

FIG. 12 shows the third embodiment of the present invention. The magnetic circuit includes: a magnet 224 (224a, 224b, 224c, 224d) having multiple poles; and coils 225a, 225b, 226. Here, description will be made with the reference numerals 224a, 224b, 224c, 224d given to the first, the second, the third, the fourth magnets, respectively, depending on polarity of the magnet 224.

Referring to FIGS. 12(a),(b), the first and the second magnets 224a and 224b symmetric in a '¬' shape, and the third and the fourth magnets 224c and 224d having opposite polarities on the lower end of the first and the second magnets 224a and 224b, are integrally attached to the yoke body 223. Accordingly, S and N poles of the first and the second magnets 224a and 224b are positioned in vertical direction, while S and N poles of the first and the third magnets 224a and 224c are positioned on the left column in vertical direction, and N and S poles of the second and the fourth magnets 224b and 224d are positioned on the right column in vertical direction. For another embodiment, instead of the above magnet having multiple poles, two magnets having two poles or four single pole magnets may be used.

Additionally, referring to FIG. 12(c), the first coil 225a on the left is faced with a boundary between the first and the third magnets, and the first coil 225b on the right is faced with a boundary between the second and the fourth magnets, and the second coil 226 on the center is faced with a boundary between the first and the second magnets. For an embodiment, the first and the second coils may be used in a printed form on a fine pattern coil PCB 230 or independently attached in form of a wire type coil.

Such magnetic circuit according to the third embodiment of the present invention is the same as the magnetic circuit in FIG. 11, so that detailed description thereof will be omitted, and the lens holder is moved in the tracking, the focusing and the tilting directions.

In the above, the magnetic circuit has been prepared with use of four polarities and three pairs of coils, but a magnetic circuit having six polarities and corresponding coil structure will be described in the following.

Fourth Embodiment

Figure 14:
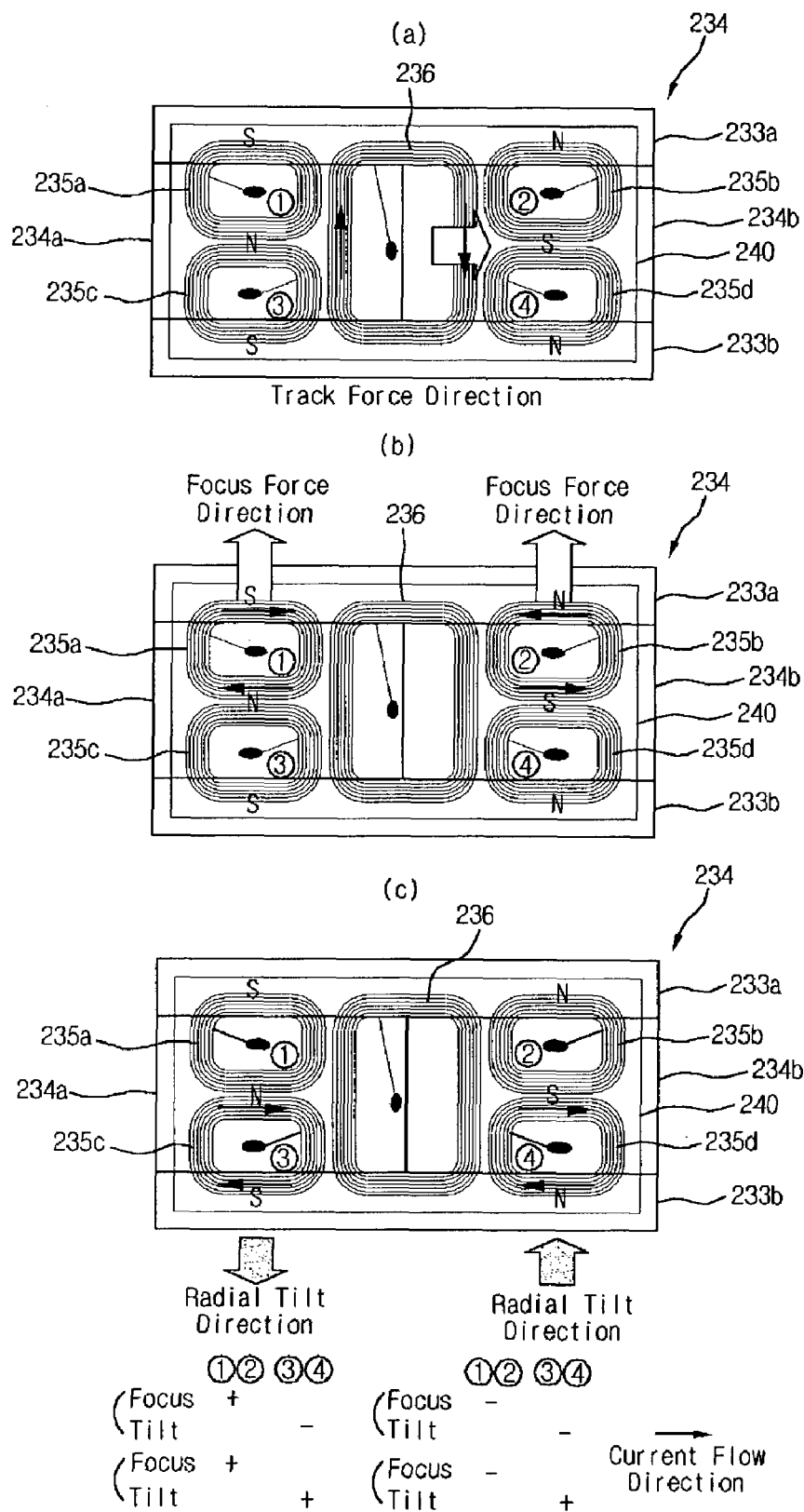
FIG. 14 is a view showing an example of movement status to the tracking, the focusing, the tilting directions by a magnetic circuit of FIG. 13.
Figure 15:
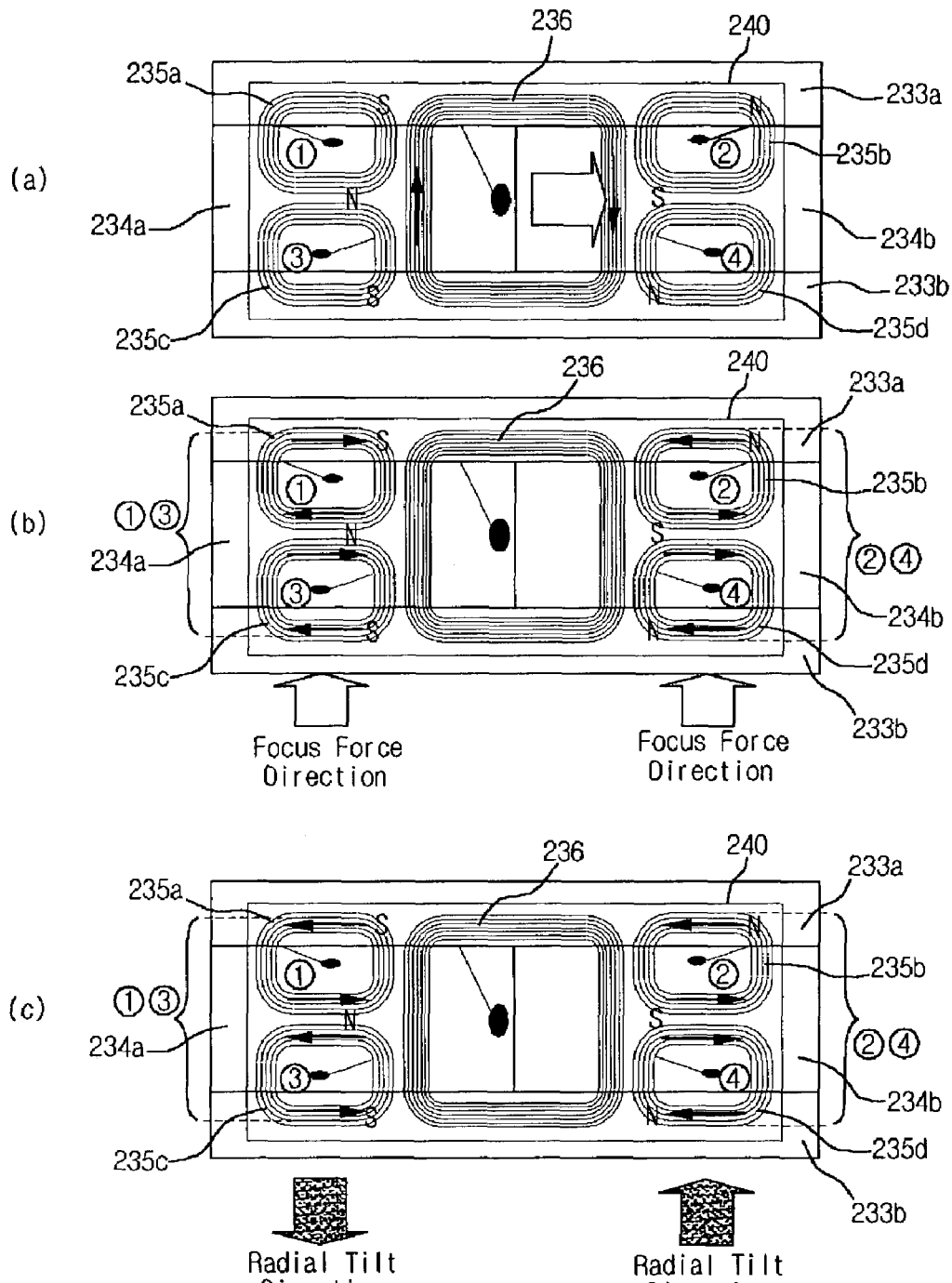
FIG. 15 is a view showing another example of movement status to the tracking, the focusing, the tilting directions by a magnetic circuit of FIG. 13.

FIG. 13 through FIG. 15 show the fourth embodiment of the present invention. The magnetic circuit includes: a magnet 234(234a, 234b) having multiple poles; a plurality of magnetic yokes 233a, 233b from which different polarities are induced; and coils 235a through 235d. Here, description will be made with the reference numerals 234a, 234b given to the first and the second magnets, respectively, depending on polarity of the magnet 234. Also, instead of the magnet having multiple poles, two single pole magnets may be used.

As shown in FIG. 13, the magnetic circuit is configured such that the magnet 234(234a, 234b) having two poles (S and N) is fixed on the center of the yoke body 233 and the first and the second magnetic yokes 233a and 233b are projected, with the same width, on the upper/lower end of the first and the second magnets 234a and 234b. Accordingly, the first and the second magnetic yokes 233a and 233b have induced polarities, respectively, opposite to the polarities of the first and the second magnets 234a and 234b on the center.

Therefore, in case that the polarities of the first and the second magnets 234a and 234b are N and S, respectively, the polarities of the first magnetic yoke 233a on the upper end are induced into S and N, and the polarities of the second magnetic yoke 233b on the lower end are induced into S and N. Here, the polarities of the magnetic yokes change depending on polarities of the magnets.

The polarities of the magnet 234 are represented as two columns S:N:S and N:S:N in vertical direction. Namely, the left column is arranged in the order of S of the first magnetic yoke, N of the first magnet, and S of the second magnetic yoke, while the right column is arranged in the order of N of the first magnetic yoke, S of the second magnet, and N of the second magnetic yoke.

Also, the coils of the magnetic circuit is configured such that a pair of 1a coils 235a and 235b on the left/right in the upper portion, a pair of 1b coils 235c and 235d on the left/right in the lower portion, the second coil 236 on the center, are formed. The 1a and 1b coils 235a through 235d are faced with boundaries between the magnets 234a, 234b and the magnetic yokes 233a, 233b, and the second coil 236 is faced with a boundary between polarities of the magnets 234a and 234b.

FIG. 14 shows an embodiment for movement control by construction of the magnetic circuit as shown in FIG. 13.

The 1a coils 235a and 235b positioned on the left/right in the upper portion are series connected each other, and the 1b coils 235c and 235d positioned on the left/right in the lower portion are series connected each other. At the moment, the focusing movement is determined through control of direction and intensity of a current applied to the 1a coils 235a and 235b on the upper portion, while the tilting movement is determined through control of direction and intensity of a current applied to the 1b coils 235c and 235d on the lower portion. Here, the left/right of the 1b coils 235c and 235d are wired in the opposite directions each other for control of the radial tilt.

Also, the tracking movement is determined through control of direction and intensity of a current applied to the second coil 236 positioned on a boundary between the first and the second magnets 234a, 234b.

Namely, as shown in FIG. 14, the magnetic circuit maybe formed by separation of the focusing coil, the tilting coil and the tracking coil. For an embodiment, as a method for improving focusing movement force, upon application of a current for the focusing movement, to ①,② of the 1a coil, a current of the same direction is applied to ③,④ of the 1b coil, so that focusing movement force could be improved.

FIG. 15 shows another embodiment for movement control by construction of the magnetic circuit as shown in FIG. 13.

According to this embodiment, a connection method for the 1a and the 1b coils 235a through 235d faced with the magnets 234a and 234b having two poles, and the magnetic yokes 233a and 233b from which four polarities are induced, is changed. Namely, among the 1a and the 1b coils 235a through 235d, the coils 235a and 235c on the left are series connected each other and the coils 235b and 235d on the right are series connected each other, so that coils on the right/left are configured in parallel with each other.

FIG. 15(a) is a view showing a status of the tracking movement.

FIG. 15(b) shows a status of the focusing movement. If directions and intensities of currents are equally controlled with respect to the right/left of the 1a and the 1b coils 235a through 235d, the coils on the right/left all are moved to the focusing direction by electromagnetic force generated between the magnets 234a, 234b and the magnetic yokes 233a, 233b faced with the coils 235a through 235d.

Also, FIG. 15(c) shows a status of the tilting movement. If directions of currents applied to the coils 235a and 235c on the left and the coils 235b and 235d on the right, are reversed with same intensity, then the movement to the radial tilting direction is controlled. Namely, the left of the lens holder is moved to the down direction and the right of the lens holder is moved to the up direction.

In other words, the magnetic circuit of FIG. 15 is configured such that ①/② and ③/④ of the first coils are series connected, respectively, and the same current is applied to ①/② coils and ③/④ coils, respectively, for the focusing movement, and currents of different directions are applied to ①/② coils and ③/④ coils of the first coils, respectively, for the tilting movement.

Fifth Embodiment

Figure 16:
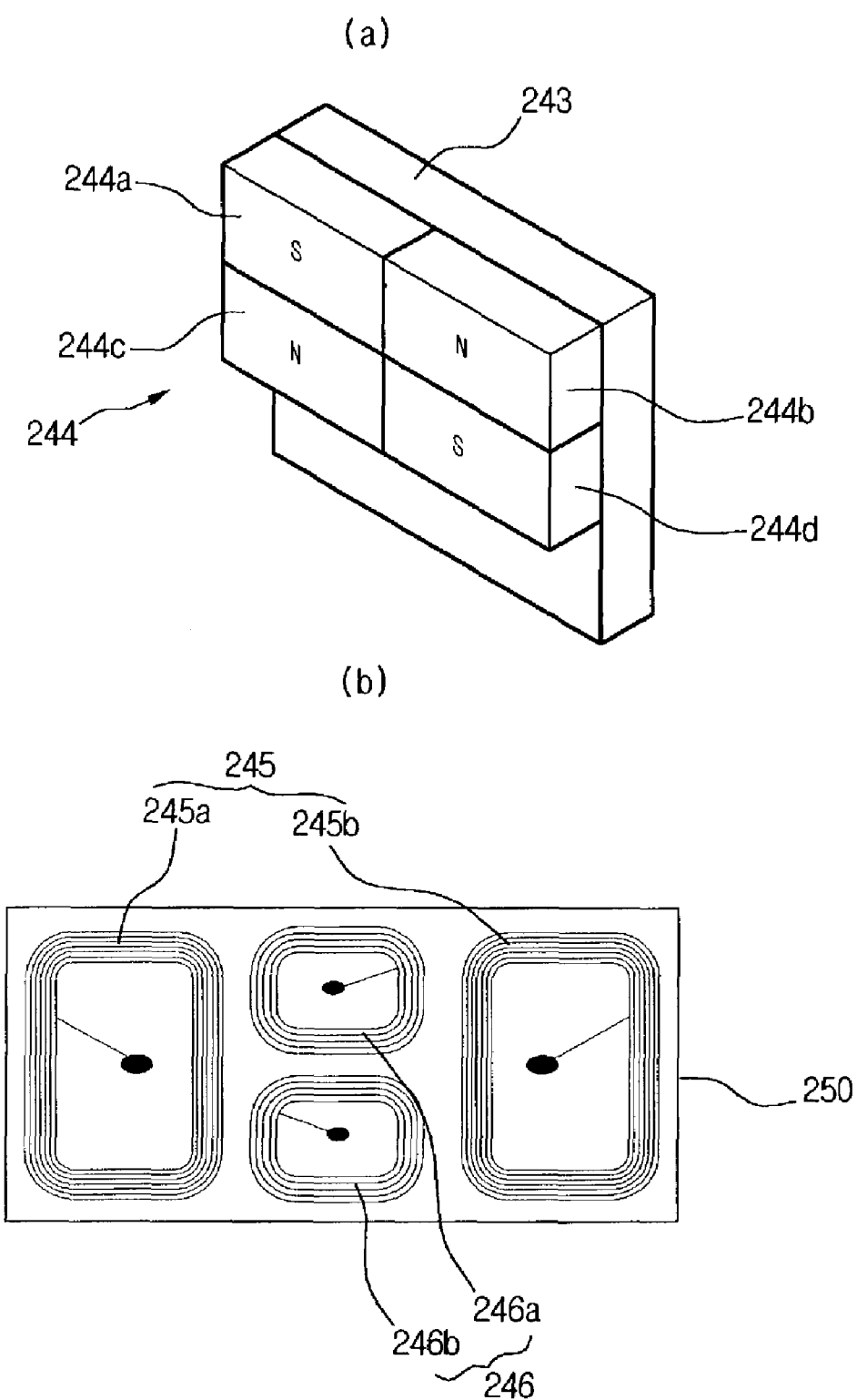
FIG. 16 is a view showing a magnetic circuit construction of an optical pick-up actuator according to a fifth embodiment of the present invention.
Figure 17:
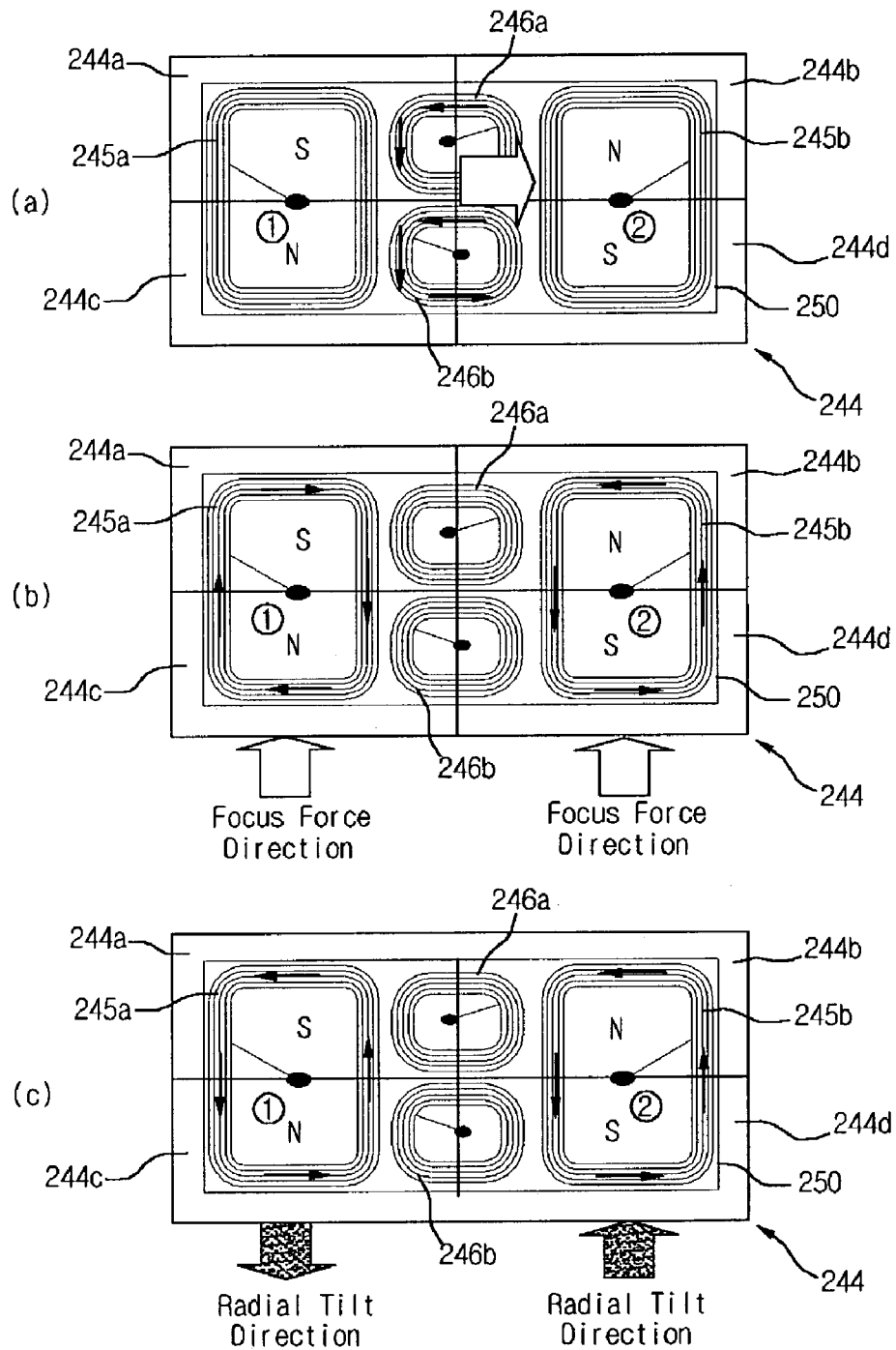
FIG. 17 is a view showing movement status to the tracking, the focusing, the tilting directions by a magnetic circuit of FIG. 14.

FIG. 16 and FIG. 17 show the fifth embodiment of the present invention. The magnetic circuit includes: a magnet 244(244a through 244d) having four poles; and a pair of the first coils 245(245a and 245b) and the second coils 246 (246a and 246b) faced with a boundary between polarities. Here, description will be made with the reference numerals 244a, 244b, 244c, 244d given to the first, the second, the third, the fourth magnets, respectively, depending on polarity of the magnet 244 having four poles.

Referring to FIG. 16, the magnet 244(244a through 244d) having four poles is fixed on the front of the yoke body 243. The first coils 245(245a and 245b) on the left/right in both sides of the lens holder, are faced with a boundary between polarities of the first and the third magnets 244a, 244c, and faced with a boundary between polarities of the second and the fourth magnets 244b, 244d vertically arranged, and are moved to the focusing/tilting directions. The second coils 246(246a and 246b) on the up/down of the center in both sides of the lens holder, are respectively faced with boundaries between polarities of the magnets 244a, 244b, and 244c, 244d, and are moved to the tracking direction. For an embodiment, instead of the magnet having four poles, four single pole magnets or two magnets having two poles may be used. Also, the coils may be used in form of a wire type coil or in a printed form on a fine pattern coil PCB 250.

FIG. 17 shows an embodiment for movement control by construction of the magnetic circuit as shown in FIG. 16. Operation of the magnetic circuit will be described in the following.

FIG. 17(a) shows a status for the tracking movement. If a current of the same direction is applied to the second coils 246a and 246b, the lens holder is moved to the tracking direction by different polarities of the magnets 244a through 244d.

FIG. 17(b) shows a status for the focusing movement. If the first coils on the right/left are controlled by a current of the same direction and intensity, the lens holder is moved to the focusing direction by electromagnetic forces generated between the first and the third magnets 244a, 244c, and between the second and the fourth magnets 244b, 244d faced with the first coils 245a and 245b.

FIG. 17(c) shows a status for the tilting movement. If the coils 245a and 245b on the left/right are controlled by currents of opposite directions with the same intensity, the lens holder is moved to the tilting directions by electromagnetic forces generated between the magnets 244a and 244c and between the magnets 244b and 244d faced with the first coils 245a and 245b.

More specifically, in case of the focusing movement as shown in FIGS. 17(b),(c), the same current is applied to ①,② of the first coils 245a and 245b, and in case of the radial tilting movement, currents of opposite directions are respectively applied to ①, ② of the first coils, so that the final movement characteristics where the focusing movement and the tilting movement are summed, is realized by summing these two signals. Namely, directions of focusing movement force and tilting movement force could be controlled by polarity arrangements of the magnets 244, and directions of the current flowing in the first coils, whereby focusing servo and tilting servo for recording medium could be performed.

Also, the direction of the tracking movement force is controlled by the direction flowing in the second coils 246a and 246b positioned on a boundary between single pole magnets 244 on the left and the right columns, and polarity arrangement of the single pole magnets 244, whereby tracking servo for recording medium could be performed.

Also, magnetic field flux of a closed circuit is formed with use of a plurality of the single magnets 244 having different pole, and the focusing/tilting coils and tracking coil are mounted on the position where the formed magnetic field flux could be effectively used, whereby the focusing movement force, the tilting movement force and the tracking movement force could be improved.

Figure 18:
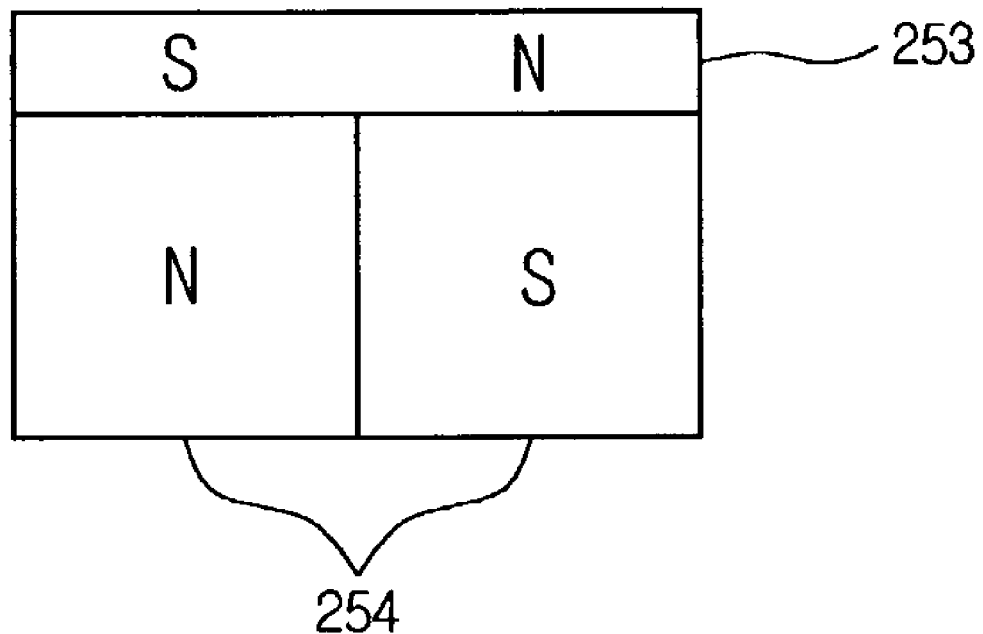
FIG. 18 is a view of construction showing another example of four polarities according to the present invention.

FIG. 18 shows an example of a polarity generating means for the magnetic circuit. It is another embodiment of four polarities, in which a magnet having two poles or a plurality of single pole magnets is formed, and a magnetic yoke 253 having the same width as the above magnet and from which opposite polarities are induced, is formed.

In the meantime, FIG. 19 and FIG. 22 are drawings showing magnetic field distribution for the wire type coil and polarity.

FIG. 19 shows the first embodiment applying the wire type coil.

As shown in FIG. 19(a), the magnetic circuit includes: two single pole magnets 304 or one magnet having two poles on the front of the yoke body 303; a pair of first coils 305 on the right/left, faced with the single pole magnet in vertical direction; and the second coil 306 on the center, faced with the boundary between polarities in horizontal direction. Accordingly, as shown in FIG. 19(b), the magnetic flux has characteristic distribution diverging from N pole and converging into S pole and the yoke body.

FIG. 20 shows the second embodiment applying the wire type coil.

FIG. 20(a) is the same as the magnetic circuit in FIG. 7 in its construction, so that detailed description thereof will be omitted. Namely, if opposite polarities S and N are induced at two magnetic yokes 313a and 313b, respectively, by the magnet 314 having two poles N and S or one magnet having two poles, then four polarities are generated, so that the magnetic field flux, as shown in FIG. 20(b), diverges from N pole, converging into S pole, thereby constituting a closed circuit.

FIG. 21 and FIG. 22 show the third and the fourth embodiments applying the wire type coil.

FIG. 21(a) and FIG. 22(a) show construction of the magnetic circuit including: the magnet 324 having four poles; a pair of first coils 325 on the right/left, faced with the magnet; and the second coil 326 on the center. FIG. 21(b) and FIG. 22(b) are drawings showing magnetic field distributions due to the magnet having four poles. Here, instead of the magnet having four poles, four single pole magnets or two magnets having two poles may be used.

Figure 23:
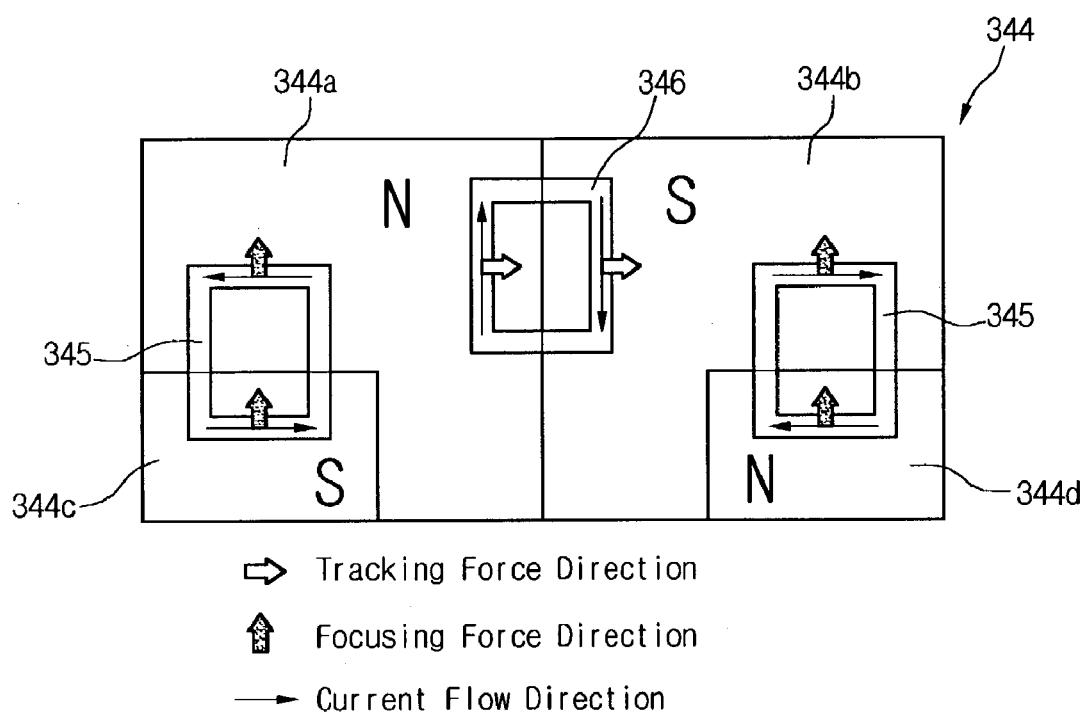
FIG. 23 is a view showing the tracking, the focusing movement status by a magnetic circuit of FIG. 22.

FIG. 23 is another embodiment of the present invention, showing the magnetic circuit of two axes where the tracking and the focusing movements are possibly performed with use of three pairs of coils 345 and 346 faced with the magnets 344(344a through 344d) having four poles.

Figure 24:
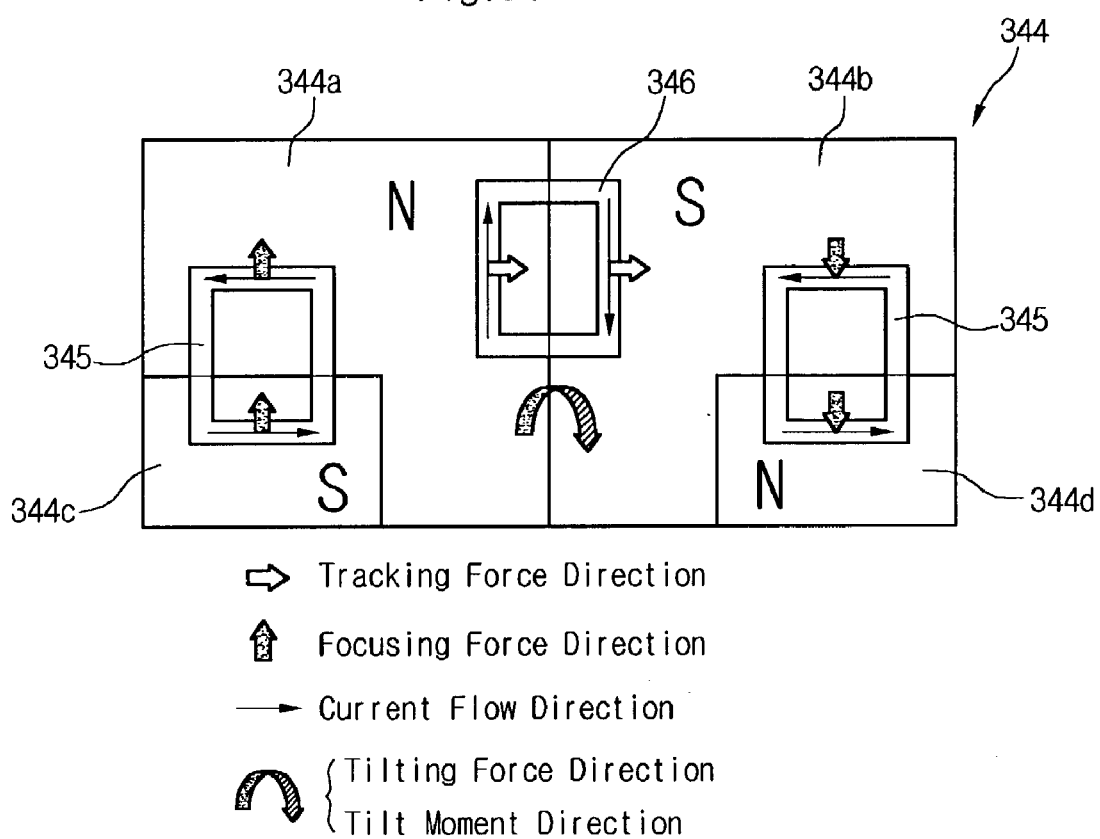
FIG. 24 is a view showing movement status to the tracking, the focusing, the tilting directions by a magnetic circuit of FIG. 22.

FIG. 24 is further another embodiment of the present invention, showing the magnetic circuit of three axes where the tracking, the focusing and the tilting movements are possibly performed with use of three pairs of coils 345 and 346 faced with the magnets 344 having four poles.

All the embodiments (the first through the fourth embodiments) described in the foregoing, relates to the actuator of three axes for the focusing, the tracking, and the tilting movements. If the actuator of two axes of the related art for the focusing and the tracking movements without the tilting movement, is used for application, a pair of the focusing coils on the right/left parallel connected, is all simply series connected, so that the same current flows and usage for only the focusing movement may be possible. Therefore, the actuator could be used as the actuator of two axes together with the tracking movement of the related art. As operation thereof would be understood from descriptions of each embodiment in the above, detailed description will be omitted.

Figure 25:
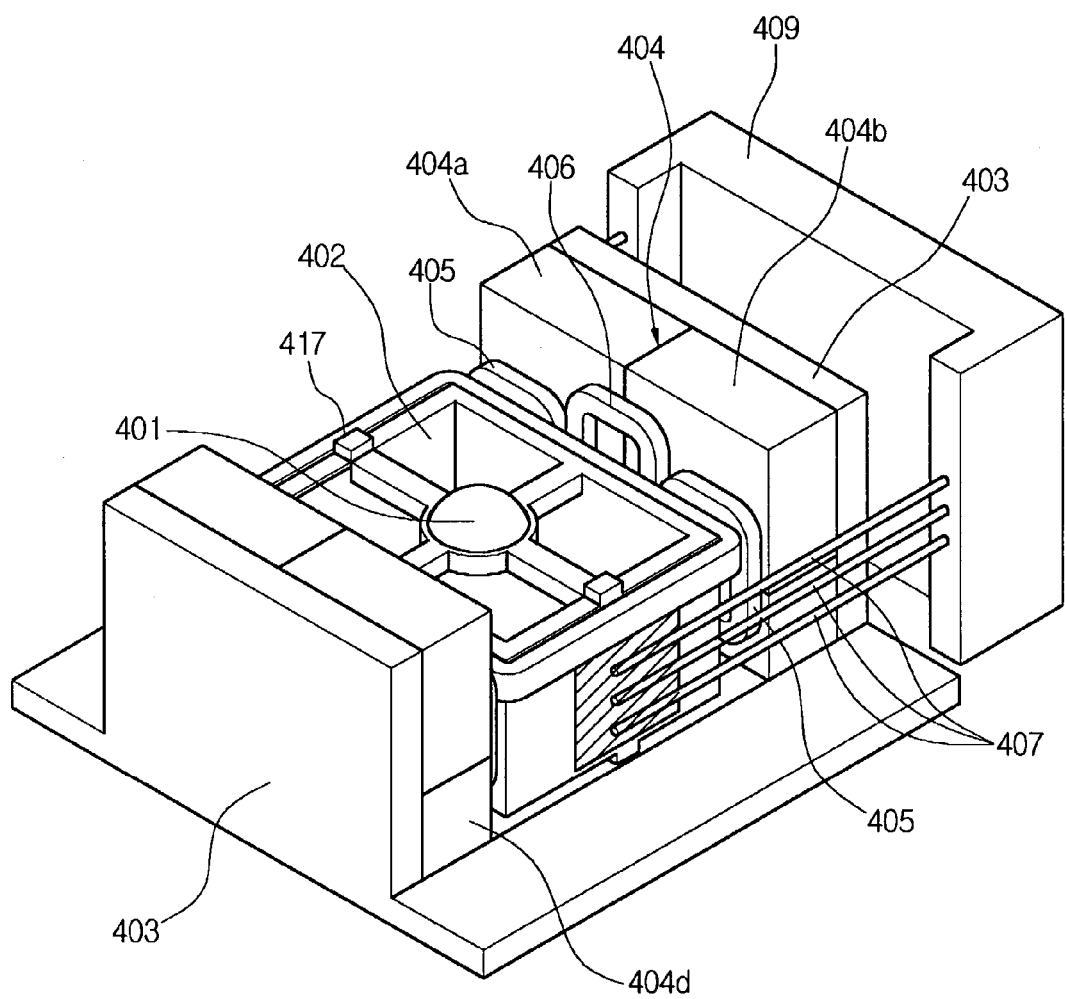
FIG. 25 is a view of construction showing another embodiment of an optical pick-up actuator according to the present invention.
Figure 26:
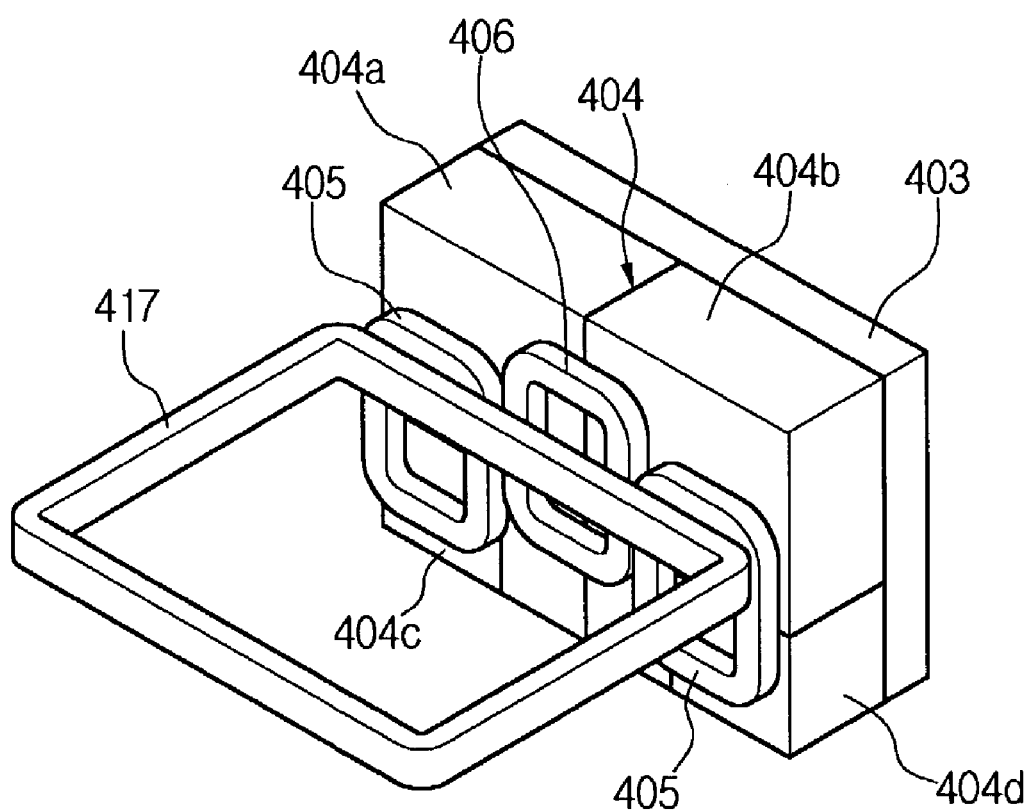
FIG. 26 is a view of a magnetic circuit construction of FIG. 25 of the present invention.
Figure 27:
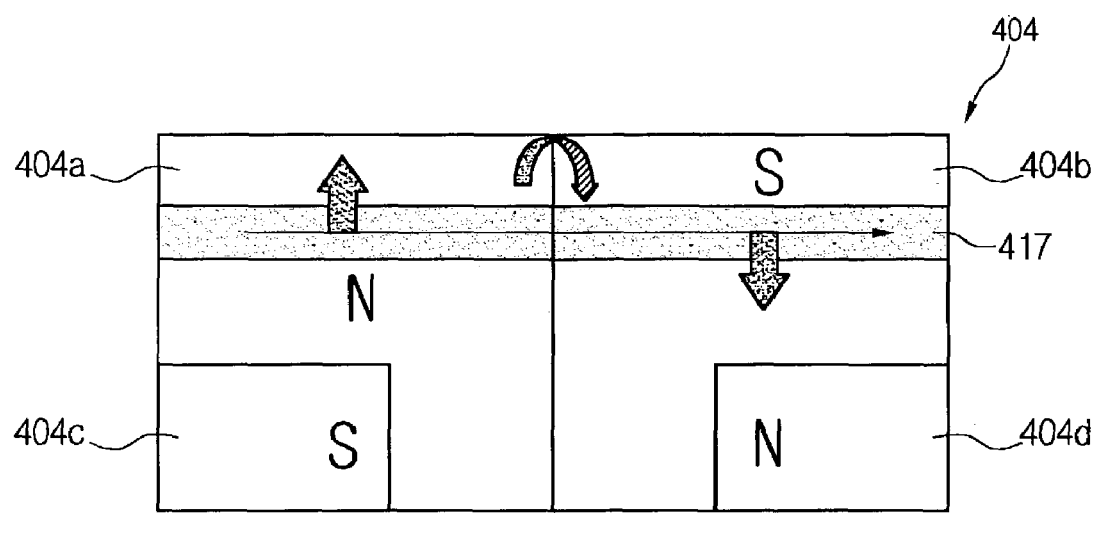
FIG. 27 is a view showing tilting movement status in a magnetic circuit of FIG. 26.

FIG. 25 through FIG. 27 show still further another embodiment of the present invention.

Referring to FIG. 25, the magnetic circuit for the tracking and the focusing movement is formed by the magnet 404 (404a through 404d) having multiple poles, or four single pole magnets, or two magnets having two poles, faced with the coils 405 and 406 on both sides of the lens holder, and the magnetic circuit for the radial tilting movement is formed by the magnets 404a and 404b, and the third coil 417 wired on the outer periphery of the lens holder 402. Here, description will be made with the reference numerals 404a, 404b, 404c, 404d given to the first, the second, the third, the fourth magnets, respectively, depending on polarity of the magnet 404.

Referring to FIG. 26 and FIG. 27, the first coils 405 are faced with the boundaries between polarities of the magnets 404a, 404c and 404b, 404d having different polarities, which are vertically arranged on the left and right sides, and the second coil 406 is faced with the boundary between polarities of the first and the second magnets 404a, 404b having different polarities, which are horizontally arranged on the center, and the third coil 417 is horizontally wired and faced with the boundary between polarities of the first and the second magnets 404a, 404b which are horizontally arranged.

Therefore, if a current of the same direction and the same intensity is applied to the first coil 405, the first coil 405 is moved to the up/down directions vertically under the influence of electromagnetic force generated between the first and the third magnets 404a, 404c, and between the second and the fourth magnets 404b, 404d which are vertically different in their polarities, while the second coil 406 is moved to the right/left directions horizontally under the influence of electromagnetic force generated between the first and the second magnets 404a, 404b which are horizontally different in their polarities.

Also, the third coil 417 is the radial tilting coil. If a current of a predetermined direction, is applied to the third coil 417, the left and the right of the third coil 417 are moved to the vertically opposite directions, respectively, under the influence of electromagnetic force generated between the first and the second magnets 404a, 404b which are horizontally different in their polarities, so that the radial tilting movement is performed.

Also, for an embodiment of the present invention, at least two or three wire suspensions 407 could be connected to the center on the right/left of the lens holder in order to provide a current to the coils 405 and 417.

According to the present invention, three coils on both sides of the lens holder are faced with perpendicularly different polarities, so that control of three axes including the tracking, the focusing, and the tilting movements, is possibly performed. For this purpose, as a perpendicular polarity generating means, one single magnet having multiple poles, or a plurality of single pole magnets, or combination of magnetic yokes whose opposite polarities are induced from one side of the magnet, could be used. Also, at least four polarities are provided as perpendicularly different polarities.

Also, the coils could be used in form of the wire type coil or in a printed form on the PCB of the fine pattern coil shape.

In the meantime, a type using the separate tilting coil according to an embodiment in FIG. 26, could be used for the actuator for the focusing, the tracking, and the tilting movements like all the above embodiments (the first-the fifth embodiments). At the moment, a pair of the coils on the right/left parallel connected is all series connected so that the same current may flow and only the focusing movement is possibly performed, for the tilting movement is no more needed. As operation method thereof would be understood from descriptions of embodiments in the above, detailed description will be omitted.

As described above, the present invention realizes effects due to the magnet having multiple poles, by constituting a closed circuit using magnetic flux generated from the magnet having multiple poles, or by obtaining multiple polarities using the single pole magnets and the magnetic yokes, whereby movement forces of the focusing, the tracking, and the tilting coils prepared on the relevant position are possibly improved.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An optical pick-up actuator comprising:
    a lens holder for receiving and moving an object lens in a predetermined direction;
    a plurality of first coils connected in parallel on one side of the lens holder, for moving the lens holder in focusing and tilting directions;
    a single second coil attached to each central portion of both the right and left sides of the lens holder, for moving the lens bolder in a tracking direction; and
    a polarity generating means facing the first and the second coils, for generating different polarities in perpendicular directions,
    wherein movement centers of the plurality of first coils face boundaries between polarities of the polarity generating means having different polarities in a vertical direction, and the first coils are moved in focusing/tilting directions, and the plurality of first coils further comprise:
    upper focusing coils connected in series on both the right and left sides of the lens holder, each upper focusing coil facing the boundary between polarities of a magnet and a magnetic yoke, for a focusing movement; and
    lower tilting coils connected in series on both the right and left sides of the lens holder, and the movement center of each lower tilting coil facing the boundary between polarities of the magnet and the magnetic yoke having different polarities, for a tilting movement.

2. The actuator according to claim 1, wherein the focusing and tilting movements of the first coils are determined by a direction and intensity of a current.

3. The actuator according to claim 1, wherein a movement center of the second coil faces boundaries between polarities of the polarity generating means having different polarities in a horizontal direction, and the second coil is moved in a tracking direction.

4. The actuator according to claim 1, wherein the polarity generating means comprises one single magnet having multiple poles to the left of the lens holder and one single magnet having multiple poles to the right of the lens holder such that different polarities are perpendicular to each other in horizontal and vertical directions.

5. The actuator according to claim 1, wherein the polarity generating means comprises a magnet having multiple poles for generating different polarities in a horizontal direction and a plurality of magnetic yokes for inducing polarities perpendicularly opposite to the different polarities of the magnet.

6. The actuator according to claim 1, wherein the polarity generating means comprises a plurality of magnets having single polarity in a horizontal direction and a plurality of magnetic yokes for inducing polarities perpendicularly opposite to polarities of the plurality of magnets.

7. The actuator according to claim 6, wherein each of the plurality of magnetic yokes is projected from a yoke body, in parallel with one side of each of the plurality of magnets.

8. The actuator according to claim 1, wherein the polarity generating means comprises a single pole magnet in horizontal and vertical directions, and a magnetic yoke for inducing a polarity opposite to the polarity of the single pole magnet, such that at least four perpendicular polarities are generated in different directions.

9. The actuator according to claim 1, wherein a movement center of the second coil faces boundaries between polarities of a magnet having multiple poles of different polarities in a horizontal direction, and the second coil is moved in a tracking direction.

10. The actuator according to claim 1, wherein the polarity generating means comprises a magnet and a magnetic yoke of a right/left symmetrical shape with respect to a movement center of the second coil.

11. The actuator according to claim 1, wherein the first and the second coils comprise one of wire type coils and fine pattern coil PCBs and are attached to both sides of the lens holder.

12. An optical pick-up actuator comprising: a lens holder for receiving and moving an object lens in a predetermined direction; and a magnetic circuit comprising: coils connected in series and parallel on both sides of the lens holder; and a yoke and a magnet facing the coils, for generating and inducing different polarities in perpendicular directions,
    wherein the magnet has multiple poles in symmetrically perpendicular 'L' shape and is attached horizontally on a yoke body, and the actuator moves the lens holder in tracking, focusing, and tilting directions according to a direction and intensity of a current by the magnetic circuit.

13. The actuator according to claim 12, wherein a radial tilting coil is wired on a periphery of the lens holder, so that each coil is independently moved in the tracking, focusing, and tilting directions with respect to a boundary between polarities of the magnet.

* * * * *